(12) United States Patent
Lin et al.

(10) Patent No.: US 7,761,538 B2
(45) Date of Patent: Jul. 20, 2010

(54) DYNAMICALLY CONFIGURING, ALLOCATING AND DEPLOYING COMPUTING SYSTEMS

(75) Inventors: Chi-Ming Lin, Sammamish, WA (US); Sheng Zhou, Bellevue, WA (US); Durgesh Nandan, Redmond, WA (US); Jeffrey Lee Albertson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 11/512,785

(22) Filed: Aug. 30, 2006

(65) Prior Publication Data

US 2008/0059610 A1 Mar. 6, 2008

(51) Int. Cl.
*G06F 15/177* (2006.01)
*G06F 9/445* (2006.01)

(52) U.S. Cl. .................................. 709/220; 717/174

(58) Field of Classification Search ......... 709/220–222, 709/223–226; 717/127, 168–178; 715/701
See application file for complete search history.

(56) References Cited

U.S. PATENT DOCUMENTS

| | | | |
|---|---|---|---|
| 5,761,380 A * | 6/1998 | Lewis et al. | 706/47 |
| 6,202,206 B1 | 3/2001 | Dean et al. | 717/11 |
| 6,275,987 B1 * | 8/2001 | Fraley et al. | 717/127 |
| 6,360,366 B1 | 3/2002 | Heath et al. | 717/1 |
| 6,385,766 B1 * | 5/2002 | Doran et al. | 717/174 |
| 6,854,112 B2 | 2/2005 | Crespo et al. | 717/174 |
| 6,986,135 B2 * | 1/2006 | Leathers et al. | 717/177 |
| 7,010,601 B2 | 3/2006 | Yoshimine et al. | 709/226 |
| 7,200,530 B2 * | 4/2007 | Brown et al. | 703/1 |
| 2002/0026512 A1 | 2/2002 | Nishimura et al. | 709/226 |
| 2002/0091805 A1 * | 7/2002 | Phillips et al. | 709/220 |
| 2002/0156874 A1 * | 10/2002 | Suorsa et al. | 709/220 |
| 2002/0156894 A1 * | 10/2002 | Suorsa et al. | 709/226 |
| 2003/0028642 A1 | 2/2003 | Agarwal et al. | 709/226 |
| 2003/0126202 A1 | 7/2003 | Watt | 709/203 |
| 2004/0088386 A1 * | 5/2004 | Aggarwal | 709/220 |
| 2004/0111509 A1 | 6/2004 | Eilam et al. | 709/224 |
| 2004/0187124 A1 | 9/2004 | Labelle | 718/100 |
| 2004/0194082 A1 * | 9/2004 | Purkeypile et al. | 717/174 |

(Continued)

FOREIGN PATENT DOCUMENTS

WO    WO2008028008 A1    3/2008

OTHER PUBLICATIONS

Kim and Nahrstedt, "A Resource Broker Model with Integrated Reservation Scheme", 2000 http://ieeexplore.ieee.org/iel5/6974/18880/00871495.pdf.

(Continued)

*Primary Examiner*—Joseph E Avellino
*Assistant Examiner*—Catherine Thiaw
(74) *Attorney, Agent, or Firm*—Merchant & Gould P.C.

(57) ABSTRACT

Computing systems can be dynamically configured, allocated, and deployed based on user requirements. For example, a user can request a number of servers for dynamic configuration, allocation, and deployment. Embodiments provide a quick and efficient way for users to test code and programs, debug code and programs, and/or perform other configuration and testing operations using one or more computing systems, such as a cluster of servers. Reserved systems are dynamically configured with necessary code and/or content according to user requirements. The reserved cluster of systems can be returned to an available pool once a reservation expires, allowing the returned systems to be used for a subsequent reservation.

18 Claims, 18 Drawing Sheets

U.S. PATENT DOCUMENTS

| | | | |
|---|---|---|---|
| 2004/0194084 A1* | 9/2004 | Matsunami et al. | 717/174 |
| 2004/0255010 A1* | 12/2004 | Finni | 709/220 |
| 2005/0050175 A1* | 3/2005 | Fong et al. | 709/220 |
| 2005/0091215 A1 | 4/2005 | Chandra et al. | 707/10 |
| 2005/0091217 A1 | 4/2005 | Schlangen | 707/10 |
| 2006/0031536 A1 | 2/2006 | Eydelman et al. | 709/228 |
| 2006/0075079 A1* | 4/2006 | Powers et al. | 709/220 |
| 2006/0095917 A1 | 5/2006 | Black-Ziegelbein et al. | 718/104 |
| 2006/0195572 A1* | 8/2006 | Srivastava et al. | 709/224 |
| 2007/0168861 A1* | 7/2007 | Bell et al. | 715/701 |
| 2007/0260500 A1 | 11/2007 | Boyette et al. | 717/101 |

OTHER PUBLICATIONS

Kubicek et. al., "Dynamic Allocation of Servers to Jobs in a Grid Hosting Environment", 2004 http://www.allhands.org.uk/2004/proceedings/papers/55.pdf.

Nakrani and Tovey, "On Honey Bees and Dynamic Server Allocation in Internet Hosting Centers", 2004 http://adb.sagepub.com/cgi/content/abstract/12/3-4/223.

PCT International Search Report, International Application No. PCT/US 2007/077183, Aug. 30, 2007, (10 pages).

PCT/US2007/077183 International Search Report dated Jan. 25, 2008 (10 pages).

* cited by examiner

FIGURE 5B

DYNAMICALLY CONFIGURING, ALLOCATING AND DEPLOYING COMPUTING SYSTEMS

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Technology has become an integral part in the day-to-day operations of many, if not most, business models. Some business models rely on a large number of computing systems in the day-to-day operations; often referred to as an enterprise setting. Currently, a number of administrators and associated support are tasked with the difficult and often lengthy undertaking to configure and deploy each computing system. For example, an administrator and support staff may spend many hours and days setting up and configuring a server farm for an organization. Moreover, in certain circumstances, a previously configured computing system may need to be reconfigured for a particular purpose. The reconfiguration can take just as long or longer as compared with the original deployment. This is an inefficient and costly process.

An example serves to illustrate the inefficient, costly, and in many cases, cumbersome process of configuring and deploying several computing systems. In this example, a tester needs to replicate a server cluster to perform content testing. The tester first needs to call-in or e-mail the replication request. After receiving the request, a system engineer searches for available servers to satisfy the request. If the requested number of servers are available, the system engineer rebuilds the servers in accordance with the configuration request and sends status e-mails (or makes calls) to relevant parties.

Next, the system engineer has to manually create a new machine.xml file including adding new server names. The system engineer then pulls the shipment file for the particular cluster. A shipment file can be described as a file or program that includes code and content jobs which have deployed to certain a particular cluster and/or environment. The system engineer then uses a deployment tool (e.g. command line dispatch) to deploy relevant bits on the servers.

Once each server has been successfully configured and deployed, the system engineer sends an acknowledging e-mail or makes a call to the relevant parties, including a request to inform the engineer once the servers are no longer required. Adding further difficulty to the problem, the system engineer has no easy way to track all of the information associated with the particular configuration and deployment. Thus, the current state of configuring and deploying multiple computing systems typically requires many man hours and can be a costly and error prone process.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to dynamically configure, allocate, and/or deploy one or more computing systems based on user requirements and/or input. Reserved systems can be dynamically configured with necessary code and/or content according to user requirements. For example, a number of servers can be dynamically configured, allocated, and deployed according to a user request. The dynamically deployed servers can be used to quickly and efficiently test code and programs, debug code and programs, and/or perform other configuration and testing operations.

A reserved cluster of systems can be returned to an available pool once a reservation expires, allowing the returned systems to be reconfigured, reallocated, and/or redeployed for a subsequent reservation. For example, servers may be reconfigured from one configuration to a different configuration. Servers also may be reallocated from one service type to a different service type. In various embodiments, a computing system, such as a server for example, can be reserved for particular usage requirements and/or for specified amounts of time. Based on the reservation requirements, the computing system can be dynamically configured to maintain a particular configuration through a reservation period.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 5A-5C depict various instances of a user interface.

DETAILED DESCRIPTION

Embodiments are provided to dynamically configure, allocate, and/or deploy one or more computing systems in a network. In an embodiment, a user can reserve a cluster of servers, wherein the cluster is dynamically configured, allocated, and deployed according to the user's requirements. Embodiments provide a quick and efficient way for users to test code and programs, debug code and programs, and/or perform other configuration and testing operations using one or more computing systems, such as a cluster of servers. For example, a number of servers can be reserved or requested with particular deployment details according to a desired implementation. The number of servers can then be allocated from a common pool. Once allocated, the number of servers can be configured by installing an operating systems (OS), middleware, and/or test bits in accordance with the requested deployment details. The configured servers can then be deployed in time to coincide with the start of the reservation. Any necessary notifications and status information can be automatically provided to one or more users to successfully interact (e.g. for testing purposes, debugging purposes, etc.) with a reserved cluster.

Figure 1:
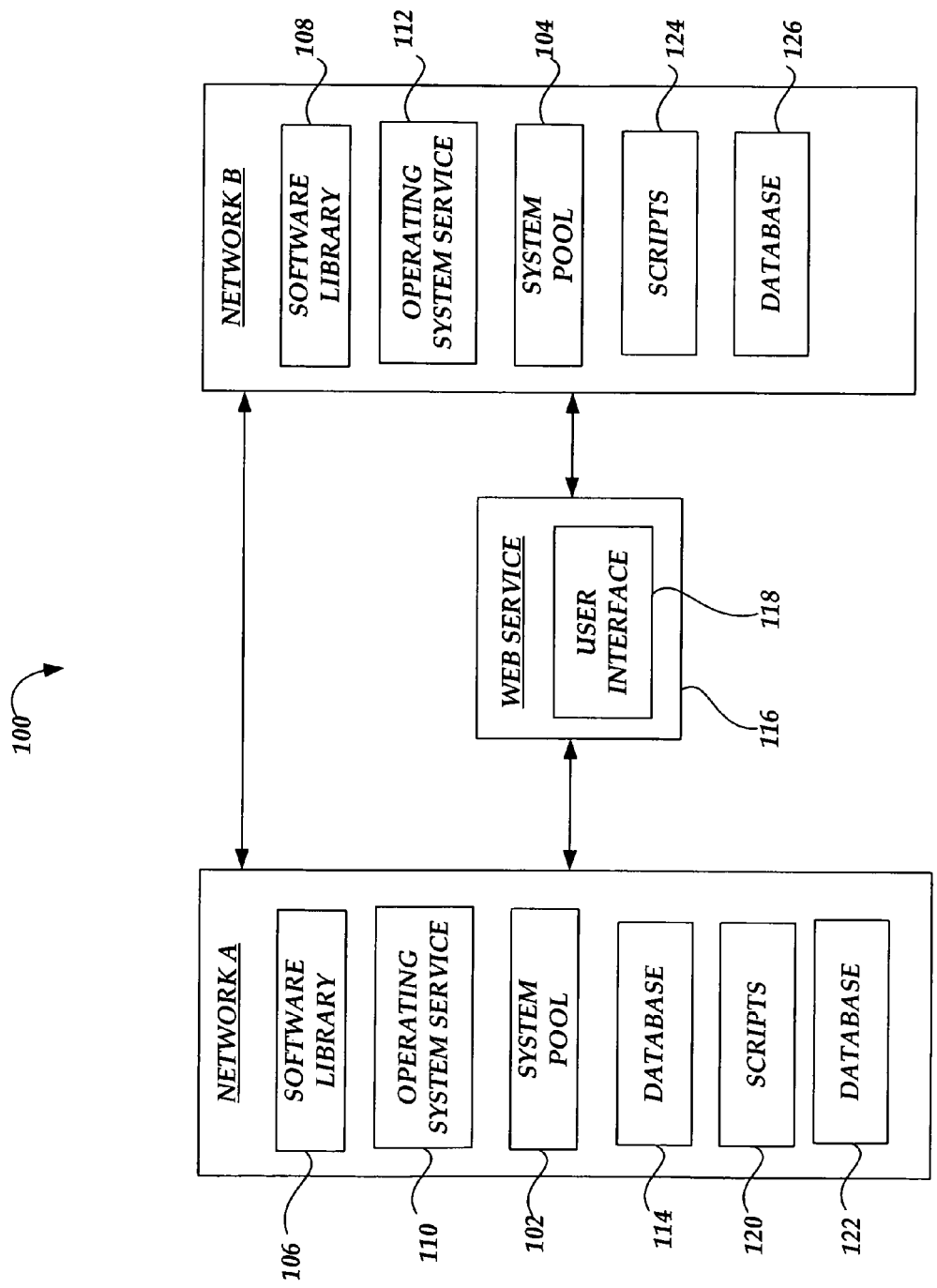
FIG. 1 depicts a block diagram of a computing network.

FIG. 1 is a diagram of a computing network 100, according to an embodiment. As described below, components of the computing network 100 are configured and can operate to dynamically configure, allocate, and/or deploy one or more computing systems in the network 100 or another network. For example, components of the computing network 100 are configured and can operate to dynamically configure, allocate, and/or deploy one or more systems of a system pool (e.g. system pool 102, system pool 104) in the network 100. Additionally, the components can be used to reserve one or more computing systems for one or more tasks and for a desired amount of time.

The components of the computing network 100 are further configured and can operate to dynamically reconfigure, reallocate, and/or redeploy one or more computing systems in the network 100 or another network. As used herein, computing system refers to any computing device or system, including servers, desktops, handhelds, laptops, and other computing devices and systems. As used herein, the term "network" encompasses any configuration of computing devices which are transferring and manipulating information and can be implemented as a wired network, a wireless network, and/or a combination of a wired and a wireless network. While FIG. 1 depicts a networked configuration, other configurations are available.

As shown in FIG. 1, the network 100 includes a network A and a network B. As described below, one or more web components and other components are associated with the network 100, including network A and network B. Network A and network B include a number of components which are configured to provide the dynamic configuration, allocation, and/or deployment of a number of computing systems from one or more system pools 102 and 104, such as one or more servers from a server pool. While various components are shown to be included in the network 100, the various components can be otherwise located and/or shared between one or more networks. Moreover, the network 100 can include a greater or smaller number of components.

In an embodiment, Network A and Network B are in communication via a storage area network (SAN). The SAN is configured to keep software library shares in sync. SAN is configured so that data and other informational storage can be uncoupled from computing systems (e.g. servers) and attached directly to the network 100. By sharing storage on the network 100, the SAN enables highly scalable and flexible storage resource allocation, high efficiency backup solutions, and better storage utilization.

Network A and Network B each include a software library 106 and 108, respectively. In an embodiment, the software libraries 106 and 108 includes files, packages, versions, and/or other data/information that can be accessed and used to configure a computing system. That is, the software libraries are configured as central repositories or references that can be accessed to configure a computing system, but are not so limited. Network A and Network B each also include an operating system service 110 and 112, respectively. The operating system services 110 and 112 are configured to perform various tasks at various times, as described below. For example, the operating system services 110 and 112 are configured to execute deployment steps, perform system maintenance, track reservations status, return servers to the server pools, start and continue configuration steps, send notifications, etc.

In one embodiment, the operating system services 110 and 112 are configured to execute one or more deployment steps (described below) as required. The operating system services 110 and 112 make calls to stored procedures in databases 122 and 126 for a first number of deployment steps. The operating system services 110 and 112 include functionality to implement the remaining deployment steps (e.g. Dispatch and Add Users). The operating system services 110 and 112 also make proxy calls to manage Reservation Status, Deployment Status, Availability Status, and to track state changes (e.g. reservations expire, new reservations made, deployment steps finish, etc.) in the database 114. The operating system services 110 and 112 are further configured to send notifications including, but not limited to: beginning of a reservation; 24 hours to or expiration of a reservation; deployment to a reservation begins, completes, or encounters an error; push new build releases (e.g. OFFICE build releases) to the software library 108; maintain entries for the builds in the database 114; and, clean up accumulations of machine.xml and shipment files associated with file shares.

The operating system services 110 and 112 are further configured to determine whether any tasks are to be performed by periodically querying a database, such as database 114. The operating system services 110 and 112 perform these queries via a web service 116, using a proxy class for example. The operating system services 110 and 112 can also modify data and other information in the database 114 via the web service 116. The web service is configured to handle communications between the various components of the network 100, such as between the operating system services 110 and 112 and the database 114. While the web service 116 is shown to be in communication with Network A and Network B, it is not so limited.

In an embodiment, the web service 116 includes the following functions, but is not so limited:

DoDeploymentSteps(int iResvID, int iDeploymentStepFlags)—Calls prc_do_depl_steps to set reservation's pending deployment steps and set its Reservation Status to Deploying.

ScheduleEvent(string strTestServerName, string strEventName)—Schedules an Event by calling sp_ins_event_schedule_IPO.

CreateResv( . . . )—Creates a new reservation by calling prc_create_resv. Inputs correspond to parameters of prc_create_resv. Returns the ID of the newly-made reservation.

IsClusterAvailNow(int ResvID)—Returns a boolean indicating whether deployment for the reservation in question can begin immediately by calling prc_is_cluster_avail_now. Inputs are the ID of the reservation in question.

CancelResv(int ResvID)—Cancels a reservation by calling prc_cancel_resv. Inputs are the ID of the reservation to be cancelled.

GetResvInfo(int ResvID)—Returns info about a reservation by calling prc_get_resv_info. Fields in the returned recordset correspond to the columns in tblResvs. Inputs are the ID of the reservation in question.

UpdateResvInfo(intResvID, . . . )—Updates information about a reservation in tblResvs by calling prc_update_resv_info. Inputs are the ID of the reservation in question, and then correspond to the columns in tblResvs.

GetServerAvailCount(int iDomainID, DateTime dtStart, DateTime dtEnd)—Returns the number of server pool servers available in a domain for a date range by calling prc_get_server_avail_count_info. Inputs are the domain ID for the domain in question, the start of the date range, the end of the date range.

GetShipmentFileList( )—Returns a recordset of available shipment files for use by dispatch.exe by querying the CMDB.

GetOfficeBuilds( )—Returns a list of available public OFFICE Builds for deployment to a reserved cluster by calling prc_get_office_builds.

GetExpiredResvs( )—Gets a list of expired reservation IDs by calling prc_get_expired_resvs.

GetNewResvs( )—Gets a list of new reservation IDs by calling prc_get_new_resvs.

With continuing reference to FIG. 1, the web service 116 includes a user interface 118. The user interface 118 can be used to interact with the components of network 100. For example, a user can use the user interface 118 and the web service 116 to access various procedures stored in database 114 to create and manage reservations, and to view reservation and availability status. In an embodiment, the user interface 118 consists of three pages: the Home Page, the New Reservation/Edit Reservation Page, and the My Reservations/Administration Page (see FIGS. 5A-5C). The user interface 118 is configured to query and modify data via calls to the web service 116. Data submitted by a user using the user interface 118 is stored in the database 114.

The database 114 includes information required to complete the configuration, allocation, and/or deployment of one or more computing systems, such as the configuration, allocation, and deployment of a number of test servers for example. The database 114 can include reservation details and status, deployment details and status, availability details and status, etc., described further below. For example, the database 114 can include information such as the number of servers in the server pools, server names, server types, server roles, server reserve start/end times, past reservations, server deployment options, and other associated information. While the database 114 is shown to be included as part of Network A, in alternative embodiments, Network B can also include a similar database.

With continuing reference to FIG. 1, Network A includes a number of scripts 120 and an associated database 122. Network B also includes a number of scripts 124 and an associated database 126. Each server in the system pools 102 and 104 can also include a number of scripts, described below. The scripts include batch scripts for performing one or more deployment procedures or steps, as described below. For example, each script can be associated with an event. The associations, and other event data, can be stored in the databases 122 and 126. When a scheduled time of an event occurs, a script can be executed that is associated with the event.

In an embodiment, the scripts include, but are not limited to:

OS Installation Script (InstallOS.bat)—Installs an OS and joins a server to a domain. Code can be shared from INETNUKE1.bat and INETNUKE2.bat.

Debugging Tools Installation Script (InstallDebuggingTools.bat)—Installs debugging tools for a reservation.

Type Scripts include:
i. IIS.bat—Installs software, sets configuration settings to create a Web server.
ii. SQL.bat—Installs software, sets configuration settings to create a SQL server.
iii. SEA.bat—Installs software, sets configuration settings to create a Search server.
iv. CDS.bat—Installs software, sets configuration settings to create a Content server.

Role Scripts include:
i. IIS-AWS1.bat—installs software, sets configuration settings on the IIS box for the AWS web service with anonymous access.
ii. IIS-AWS2.bat—Installs software, sets configuration settings on the IIS server for the AWS service with Passport authentication.
iii. IIS-Redir.bat—Installs software, sets configuration settings on the IIS server for the OFFICE redirect service and client/server redirect service.
iv. IIS-R&R.bat—Installs software, sets configuration settings on the IIS server for the OFFICE Research & Reference service.
v. SQL-AWS.bat—Installs software, sets configuration settings on the SQL server for the AWS service.
vi. CDS-R&R.bat—Installs software, sets configuration settings on the CDS server for R&R service.
vii. CDS-Search.bat—Installs software, sets configuration settings on the CDS server for the AWS service.
viii. IIS-IPOTool.bat—Installs software, sets configuration settings on the IIS server for the IPO tools front-end.
ix. IIS-IPOservice.bat—Installs software, sets configuration settings on the IIS server for the IPO tools service.
x. SQL-IPOTools.bat—Installs software, sets configuration settings on the SQL server for IPO tools.

It is not uncommon for computing systems (e.g. data center serving computers) to have different hardware configurations based on a type. For example, SQL servers typically have bigger hard drives as compared to web servers. The different hardware configurations can require different configurations during setup, such as partition settings for example. Due in part to these hardware differences, it can be difficult to use a system with one type of hardware configuration as another type of system. Thus, in an embodiment, systems having similar hardware configurations are distinguished and aggregated in the system pools 102 and 104.

In an embodiment, the systems can be configured according to a requested type. For example, common server types include SQL servers, Content servers, and web servers. During the setup process, systems of the same type may have different middle tier software installed due in part to a service to be hosted. For instance, one type AWS web front-end has Passport installed while another AWS web server does not require Passport. Thus, dynamic server allocation and the setup process (e.g. NNP process) can apply different middle tier components to the same type of system according to the hosted service for an associated reservation.

As used herein, "type" refers to a kind of platform software that can be installed on a computing system. "Role" refers to a function for the associated computing system. Exemplary roles include, but are not limited to: FE-AWS1 which refers to front-end server for AWS web service with anonymous access; FE-AWS2 which refers to front-end server for AWS service with Passport authentication; FE-Redir which refers to front-end server for OFFICE redirect service and client/server redirect service; FE-R&R which refers to front-end server for OFFICE Research & Reference service; SQL-AWS which refers to back-end SQL server for AWS service; CDS-R&R which refers to content server for R&R service; CDS-Search which refers to search server for AWS service; FE-IPOTool which refers to web server for IPO tools; FE-IPOservice which refers to a server for IPO tools; and, SQL-IPOTools which refers to the SQL server for IPO tools.

The first part (before the hyphen) of the role is the type and the second part (after the hyphen) indicates the service it can host. NNP scripts can be modulated for each server type and role. Thus, each role can be associated with a type (e.g. IIS (Web), SQL (Database), CDS (Content), SEA (Search)). Moreover, a computing system can assume more than one role, but in certain cases, each such role can be of the same type. For example, a test computing system may assume the SQL-AWS1 and SQL-AWS2 roles, but not both the IIS-AWS1 and SQL-AWS1 roles.

Dynamic configuration and allocation can also refer to a situation wherein a similar type of computing system can be used to install different services, such as OFFICE services for example. Moreover, the role of a computing system can change from time to time for different reservations and can depend on its dynamic configuration and allocation. Take for example, a front-end server that can host an AWS service in one reservation, while acting as an R&R server in another reservation. A machine.xml file can be modified to support such a deployment. The machine.xml file can be described as an XML format file defining which machines receive which packages and particular service configurations. As described below, the machine.xml file can be used by a dispatch component to perform a deployment according to a desired implementation. The dispatch component is configured to control the installation of packages, services, and the configuring of runtime parameters on remote computing systems, such as one or more remote servers. Thus, role can be used to indicate a configuration and the code (e.g. OFFICE) needed to apply to a type of computing system according to a reservation.

In accordance with an embodiment, and using the concepts of type and role, there are seven steps in deploying to a computing system, which include, but are not limited to: 1. OS Installation; 2. Debugging Tools Installation; 3. Type Application; 4. Role Application; 5. Hotfix Application; 6. Dispatch; and, 7. Add Users. Each of deployment steps has a corresponding deployment stage, including additional deployment stages, which include, but are not limited to: 0. Not Yet Started; 1. OS Installation; 2. Debugging Tools Installation; 3. Type Application; 4. Role Application; 5. Hotfix Application; 6. Dispatch; 7. Add Users; and, 8. Finished.

The deployment steps can be tracked with a number of deployment flags. In an embodiment, the deployment flag values correspond with the first seven powers of two. The Table below illustrates deployment flag values and the corresponding deployment step.

TABLE

| Deployment Step | Flag Value |
| --- | --- |
| OS Installation | $2^0 = 1$ |
| Debugging Tools Installation | $2^1 = 2$ |
| Type Application | $2^2 = 4$ |
| Role Application | $2^3 = 8$ |
| Hotfix Application | $2^4 = 16$ |
| Dispatch | $2^5 = 32$ |
| Add Users | $2^6 = 64$ |

As described above, each computing system may not necessarily undergo all seven deployment steps. The deployment flags can be used to indicate in a single value all deployment steps that apply to the computing systems in a reservation. For instance, all seven deployment steps can be indicated by adding the flags corresponding to all seven deployment steps: 1+2+4+8+16+32+64=127. If the Debugging Tools installation step is not required, this can be indicated with the value 1+4+8+16+32+64=125.

In an embodiment, there are various kinds of scripts which correspond to the deployment steps, these include, but are not limited to: 1. The OS Installation script is used to execute code on each computing system in a reservation; 2. The Debugging Tools Installation script is used to execute code on each computing system in a reservation; 3. The Type Application script corresponds to a script to execute different code according to each type; 4. The Role Application script corresponds to a script to execute different code according to each role; and, 5. a Hotfix Application script is used to execute code on each computing system in a reservation.

Additionally, as described above, each script can be associated with an event in the databases 122 and 126. Events can be scheduled for a particular computing system by the operating system service 110 or 112. The operating system service 110 or 112 is configured to call stored procedures in the respective databases 122 and 126 to schedule an associated event. When the scheduled event's time arrives, the script associated with the event is pushed onto the target computing system by the operating system service 110 or 112, and executed. That is, each script is configured to run locally on a computing system to which the script is deployed. As the script associated with a scheduled event executes, the script execution start time, end time, success/failure status, error codes, etc., can be written to an associated database 122 or 126. Script execution data is then pushed to the database 114 by the operating system service 110 or 112, by proxy of the web service 116.

As described above, the database 114 serves as a repository for information associated with the configuration, allocation, and/or deployment of one or more computing systems. In an embodiment, the database 114 stores the reservation information that is required to provide the dynamic deployment of a test server cluster. As described below, the database 114 also maintains a number of status identifiers, such as: reservation status for an entire reservation, deployment status for each computing system in a reservation, and availability status for each computing system in a system pool, but is not so limited.

Figure 2:
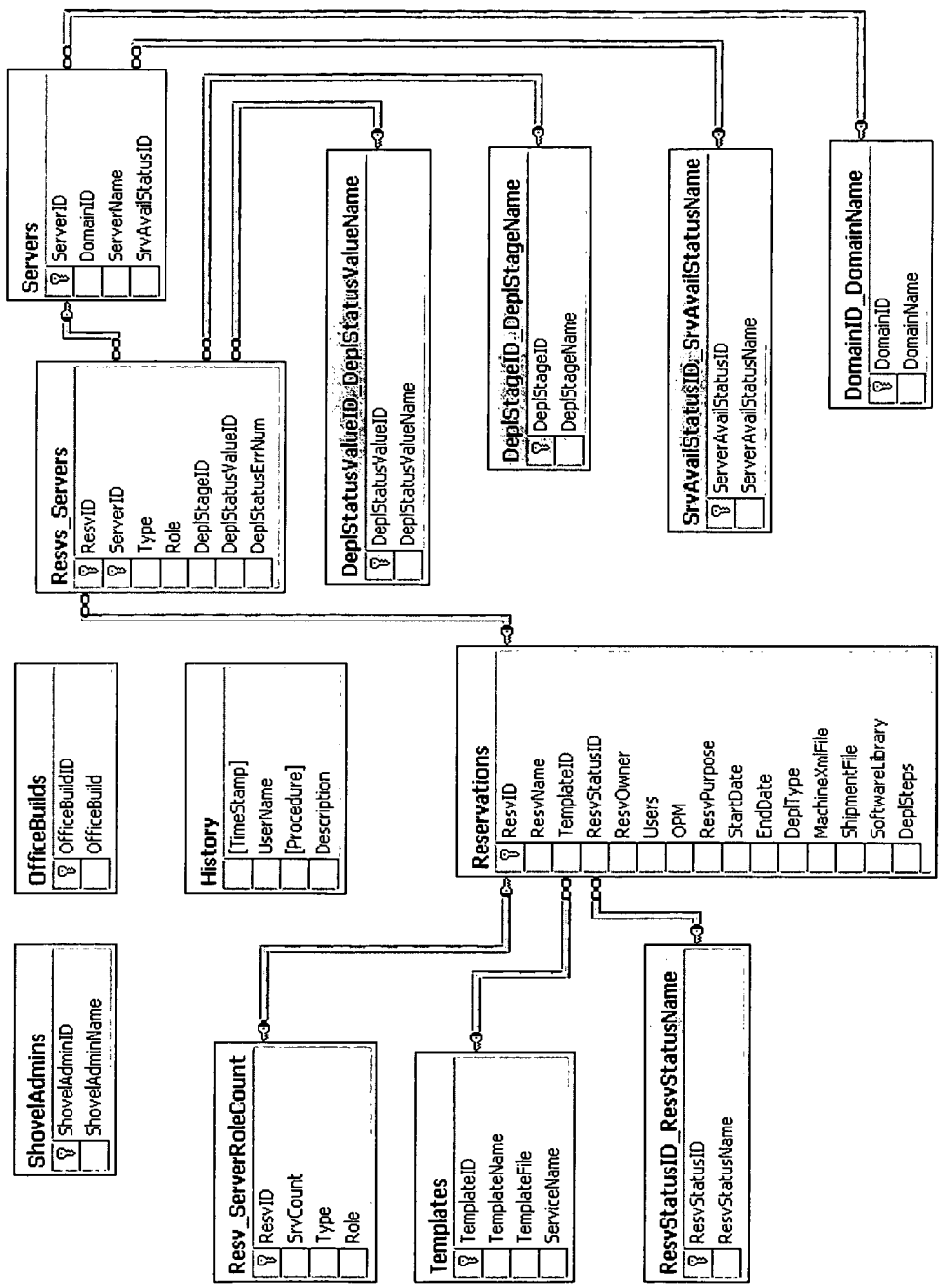
FIG. 2 is a diagram illustrating a number of tables.

Reservation information includes, but is not limited to: reservation start and end dates; reservation type (e.g. Basic, OFFICE Build, Private Release, Duplicate Cluster); the number of systems in a cluster reservation; the role and type of each system in a reservation; the location of any machine.xml and shipment files associated with a reservation; and, a reservation's friendly name and purpose. In an embodiment, the reservation information is stored in a reservation table of the database 114. FIG. 2 is a diagram illustrating a number of tables, including a reservation table structure of an embodiment. As described above, the deployment steps can vary by deployment type and can be stored in the DeplSteps field. The DeplSteps field value is the combination of deployment step flags which represent the necessary deployment steps for a particular reservation.

With continuing reference to FIG. 2, the status of a reservation or Reservation Status is stored in the ResvStatusID field. The ResvStatusID field is joined to the ResvStatusID_ReservationStatusName table. The Reservation Statuses include: Not Yet Begun, Deploying, Ready, Expiring, and Archived. When a new reservation is created, the Reservation Status is set to Not Yet Begun. The Reservation Status is set to Deploying when: a reservation's begin date arrives, a user redeploys a reservation, and/or an Administrator or OPM takes action against a reservation. The Reservation Status is set to Ready when a final deployment step for a reservation finishes. The Reservation Status is set to Expiring when a reservation's time has expired, or when the user expires a reservation (e.g. signs off). Once a reservation expires, any reserved computing systems are released, and the Reservation Status is set to Archived.

The status of a deployment or Deployment Status is stored in the Resvs_Servers table. The Resvs_Servers table includes three fields: a Deployment Stage field (DeplStageID); a field (DeplStatusValueID) containing one of three values: Running, Error, or Done; and, an Error Code field (DeplStatusError). If the DeplStatusValueID is not Error, this value will be 0. When a new reservation is created, the values of the Deployment Status fields for each computing system in the reservation are set to Not Yet Started, Done, and 0. When a deployment step begins, the DeplStageID, DeplStatusValueID, and DeplStatusErr values are set to the Deployment Stage 1D corresponding to the deployment step, Running, and 0, respectively. If there is an error in a deployment step, the DeplStatusValueID and DeplStatusErr values are set to Error and the error code, respectively. If the deployment step completes without error, the DeplStatusValueID value is set to Done. When the last deployment step finishes, the Deployment Status field values are set to Ready, Done, and 0. (Also, as described above, when the last deployment step for a reservation finishes, the Reservation Status is set to Ready).

The availability of a computing system (e.g. server availability) or Availability Status is stored in the SrvAvailStatusID field of the Servers table of FIG. 2. The SrvAvailStatusID field is joined to the SrvAvailStatusID_SrvAvailStatusName table. This table defines three Availability Statuses: Unreserved, Reserved, and In Use. During initial system setup, the Availability Status for all computing systems is set to Unreserved. When a new reservation is made, the Availability Status for the computing systems in the reservation is set to Reserved. When a reservation begins, the Availability Status for the computing systems in the reservation is set to In Use. A reservation also can be Archived in certain circumstances. If a computing system has been allocated to another reservation whose Reservation Status is Not Yet Started, then the Availability Status is set to Reserved; otherwise, the Availability Status is set to Unreserved.

As described above, there are a number of stored procedures that are associated with the tables shown in FIG. 2. In an embodiment, manipulation of information in the tables is accomplished through the stored procedures. The stored procedures include, but are not limited to: creating new reservations; get/set reservation data (Begin Date, End Date, Reservation Type, Deployment Steps, etc.); get/set Reservation Status; get/set which systems are associated with a reservation; get/set the type and role of a system of a reservation; get/set the deployment steps to be executed on systems within a reservation; get list of systems for which a next deployment step must be executed (e.g. reservations for which the Begin Date has just arrived); get the next deployment step for system; get list of reservations which have expired; get/set Deployment Status; and, get/set Availability Status.

In an embodiment, a number of stored procedures in the database 114 include, but are not limited:

prc_create_resv( . . . )—Creates a new reservation based on user input to the New Reservation/Edit Reservation page by creating a new row in tblResvs. Inputs correspond to the columns in tblResvs. Returns the ID of the newly-made reservation.

prc_is_cluster_avail_now(ResvID)—Returns a boolean indicating whether deployment for the reservation in question can begin immediately. Inputs are the ID of the reservation in question.

prc_do_depl_steps(ResvID, DeplStepFlags)—Sets reservation's DeplSteps value to DeplStepFlags, then sets its Reservation Status to Deploying. When the operating system service wakes up, it will start execution of the Deployment Steps.

prc_set_depl_steps(ResvID, DeplStepFlags)—Sets reservation's DeplSteps value to DeplStepFlags.

prc_cancel_resv(ResvID)—Cancels a reservation by marking it as archived in the Reservations table. Inputs are the ID of the reservation to be cancelled.

prc_get_resv_info(iResvID)—Returns info about a reservation; fields in returned recordset correspond to the columns in the Reservations table. Inputs are the ID of the reservation in question.

prc_update_resv_info(ResvID, . . . )—Updates information about a reservation in the Reservations table. Inputs are the ID of the reservation in question, and then correspond to the columns in tblResvs.

prc_add_user(UserName, ResvID)—Associates a new user with a reservation by adding to the Users field in the Reservations table. Inputs are the ID of the user to be added, and the ID of the reservation.

prc_get_servers_by_ResvID(ResvID)—Returns the servers associated with a reservation by querying Resvs_Servers. Inputs are the ID of the reservation in question.

prc_get_expired_resvs(Date)—Returns the IDs of the reservations that expired at the end of a date by querying the Reservations table. Inputs are the date in question.

prc_get_new_resvs(Date)—Returns the IDs of the reservations that start the beginning of a date by querying the Reservations table. Inputs are the date in question.

prc_release servers(ResvID)—For use at the end of a reservation. Resets the availability status in the Servers table of servers associated with a reservation ID. Inputs are the ID of the reservation in question.

prc_get_dispatch_info(ResvID)—Returns information needed for dispatch execution by querying the Reservations table. Inputs are the ID of the reservation in question.

prc_get_users_by_ResvID(ResvID)—Returns the names of the users associated with a reservation by querying the Reservations table. Inputs are the ID of the reservation in question.

prc_get_server_avail_count_info(iDomainID, iStart, iEnd)—Returns the number of servers available in a domain for a date range. Inputs are the domain ID for the domain in question, the start of the date range, the end of the date range.

prc_get_office_builds( )—Returns a list of available public OFFICE Builds for deployment to a reserved cluster from the OfficeBuilds table.

The databases 122 and 126 also contain a number of stored procedure including, but not limited to:

```
CREATE procedure sp_ins_event_schedule_IPO
    @event_id int,
    @name varchar(64),
    @next_task_seq int = 0,
    @defer_mins int = 1
as
    declare @schedule_id int
```

```
    declare @schedule_id2 int
    declare @computer_id int
    select @computer_id = computer_id
        from computer
        where name = @name
    exec @schedule_id = sp_get_next_system_id 'EVENT_SCHEDULE_ID'
    exec @schedule_id2 = sp_del_event_schedule_comp_event @computer_id,
@event_id
    begin transaction
    insert into event_schedule
        (schedule_id, computer_id, event_id, start_time, next_task_seq, defer_mins)
        values
        ( @schedule_id, @computer_id, @event_id, GetDate( ), @next_task_seq,
@defer_mins )
        if (@@error != 0)
        begin
            rollback transaction
            return 1
        end
        commit transaction
        select @schedule_id as schedule_id
GO
```

In accordance with an embodiment, a reservation algorithm is configured to reserve one or more computing systems of the system pools 102 and 104 based on user input using the user interface 118. In one embodiment, the reservation algorithm first assigns a computing system if the computing system does not have any current reservations. If the reservation algorithm has to assign a computing system which already has a reservation, a computing system is selected based on the largest time gap between the existing reservation and the new reservation. The reservation data can be ordered or otherwise structured (e.g. a table or view format) allowing the reservation algorithm to be simplified and streamlined. The reservation algorithm uses a reservation's start and end dates to create a table described below. The data can be generated each time a new reservation is requested.

In one embodiment, the table has three fields: ComputerName refers to a computing system name; LatestLastEnd: refers to the end date of the reservation most immediately preceding the start date of the requested reservation; and, EarliestNextStart refers to a start date of a reservation most immediately following the end date of the requested reservation. It is possible that LatestLastEnd and EarliestNextStart might be null. In such a situation they can be set to an arbitrary date. The data for the table are available by joining all non-Archived reservations in the Reservations table to the Resvs_Servers table. In certain circumstances, the resulting join might have more than one entry per server, since some servers might be reserved to more than one reservation.

One embodiment of the reservation algorithm is as follows:

```
n is the number of servers needed for the reservation
ResvID is a unique reservation id for the new reservation
StartDate and EndDate are the start date and end date of the requested
reservation
return whether it was able to allocate enough servers for the reservation
boolean AllocateServers( n, StartDate, EndDate, ResvID)
    declare StackResvServers
    // allocated Unreserved servers first (trivial function)
    nAllocatedUnreservedServers    =    AllocateUnreservedServers(n,
StackResvServers )
    nNeededServers = n - nAllocatedUnreservedServers;
    while nNeededServers is greater than 0
        if exist nNeededServers servers where ( (StartDate - LatestLastEnd >
```

```
0)
        && (EarliestNextStart - EndDate > 0) )
            select ComputerName with max StartDate - LatestEndDate;
            push ComputerName onto StackOfAllocatedServers;
            decrement nNeededServers;
            // should modify algorithm slightly to allow greater forward
extensibility
            // of newly created reservations
        else
            return false;
            // can't allocated enough servers
            // might instead call AllocateServers recursively with alternate
reservation dates,
            // then offer user alternate reservation
        end if
    end while
    while StackResvServers is not empty
        pop ComputerName from StackResvServers
        create entry in Resvs_Servers table with ResvID and ComputerName
    end while
    return true
End Function
```

Figure 3A:
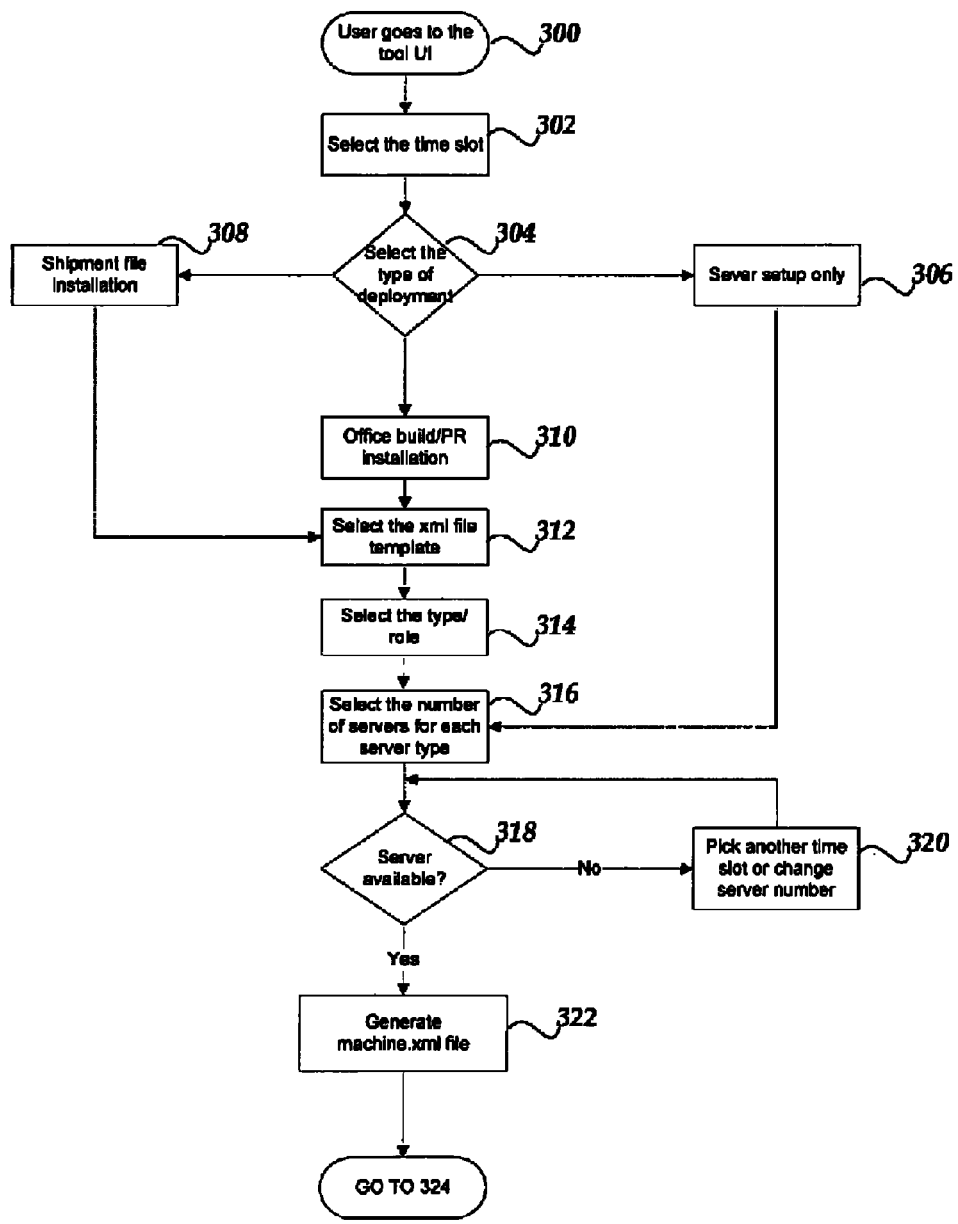
FIGS. 3A-3B depict a flow chart of the configuration, allocation, and deployment of one or more serving computers.
Figure 3B:
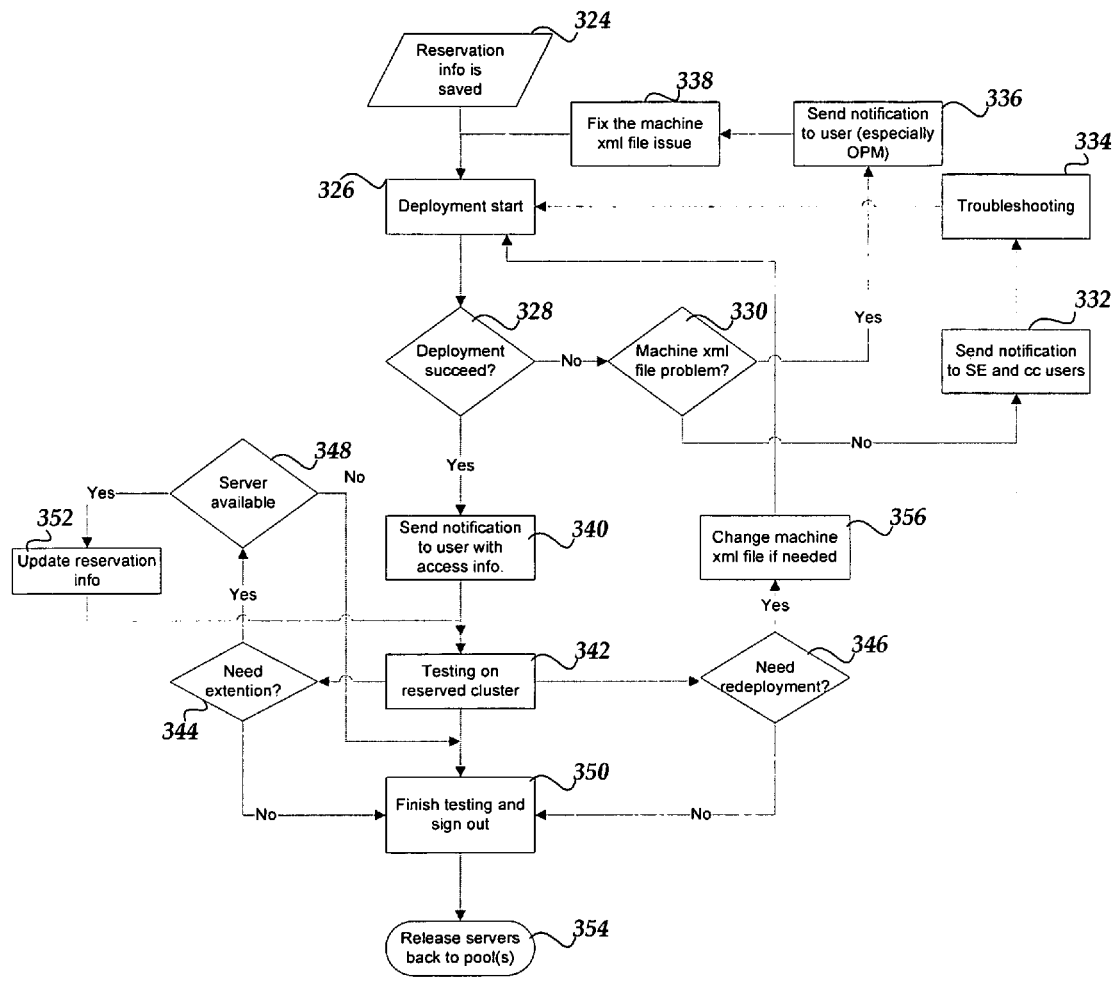

Referring now to FIGS. 3A-3B, a flow diagram illustrates the configuration, allocation, and deployment of one or more serving computers or servers in accordance with an embodiment. At 300, a user, using a web client or browser, accesses the user interface 118 to request a reservation. At 302, the user uses the user interface 118 to select a time slot associated with the reservation. At 304, the user can select a type of deployment. If the user selects a server setup only, the flow proceeds to 306. If the user selects a shipment file installation, the flow proceeds to 308. Otherwise, the flow proceeds to 310 to accommodate an OFFICE build/PR installation. At 312, if the user selected the shipment file installation option or the OFFICE build/PR installation option, the user can select a file template associated with the installation, such as an XML file template for example.

At 314, the user can select the server types and roles. At 316, the user can then select the number of servers associated with each server type. At 318, it is determined whether the requested servers are available in one or more server pools. If the servers are not available, at 320, the user has the option to select a different time slot and/or request a different number of servers. If the requested servers are available, at 322, a machine.xml file is generated and the flow proceeds to 324.

Referring to FIG. 3B, at 324, the information associated with the current reservation is saved to the database 114. At 326, the deployment begins, including the configuration of the servers in accordance with the user request (e.g. type/role). At 328, it is determined whether the requested deployment was successful. If the deployment did not succeed, at 330, it is determined if the machine.xml file caused the unsuccessful deployment. If the machine.xml file was not the cause of the unsuccessful deployment, at 332, a notification is sent to the SE and to users associated with the reservation. At 334, troubleshooting procedures are implemented and, once the troubleshooting procedures are complete, the flow returns to 326.

However, if the machine.xml file was the cause of the unsuccessful deployment, at 336, a notification is sent to the user and/or the OPM. At 338, the machine.xml file is corrected and the flow returns to 326. On the other hand, if the deployment was successful at 328, the flow proceeds to 340, and a notification of the successful deployment is sent to the user, including any access information (e.g. username, password, etc.). At 342, the deployed servers can now be used by the user and any other authorized users for testing and other purposes. At 342, the user has a number of options, such as extending the test period at 344 or asking for a redeployment of the cluster at 346.

If the user requests an extended test period, at 348 it is determined whether there are available servers to satisfy the request. If there are no available servers to satisfy the request, the flow proceeds to 350 where the user and any other users may finish testing and sign out. Thereafter, the flow proceeds to 354 and the servers are then released back to the server pool(s). If there are servers available at 348, the reservation information is updated at 352 and the flow proceeds to 342. If the user has requested a redeployment of the requested servers, at 356, the machine.xml file is changed or updated and the flow returns to 326. Otherwise, the flow proceeds to 354 and the servers are released back to the server pool(s).

Figure 4A:
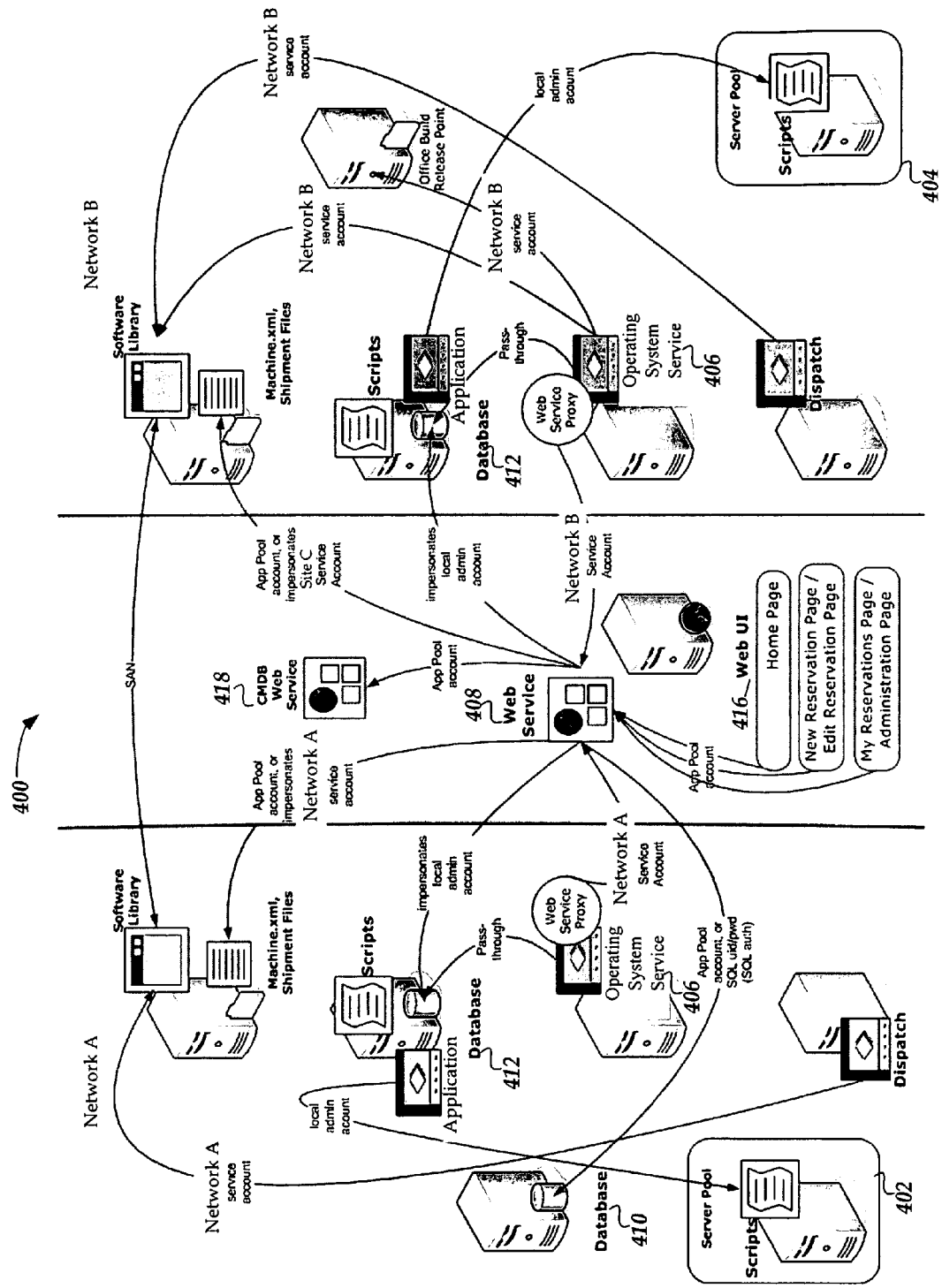
FIGS. 4A-4I depict functional block diagrams of a network and the configuration, allocation, and deployment of one or more serving computers.
Figure 4B:
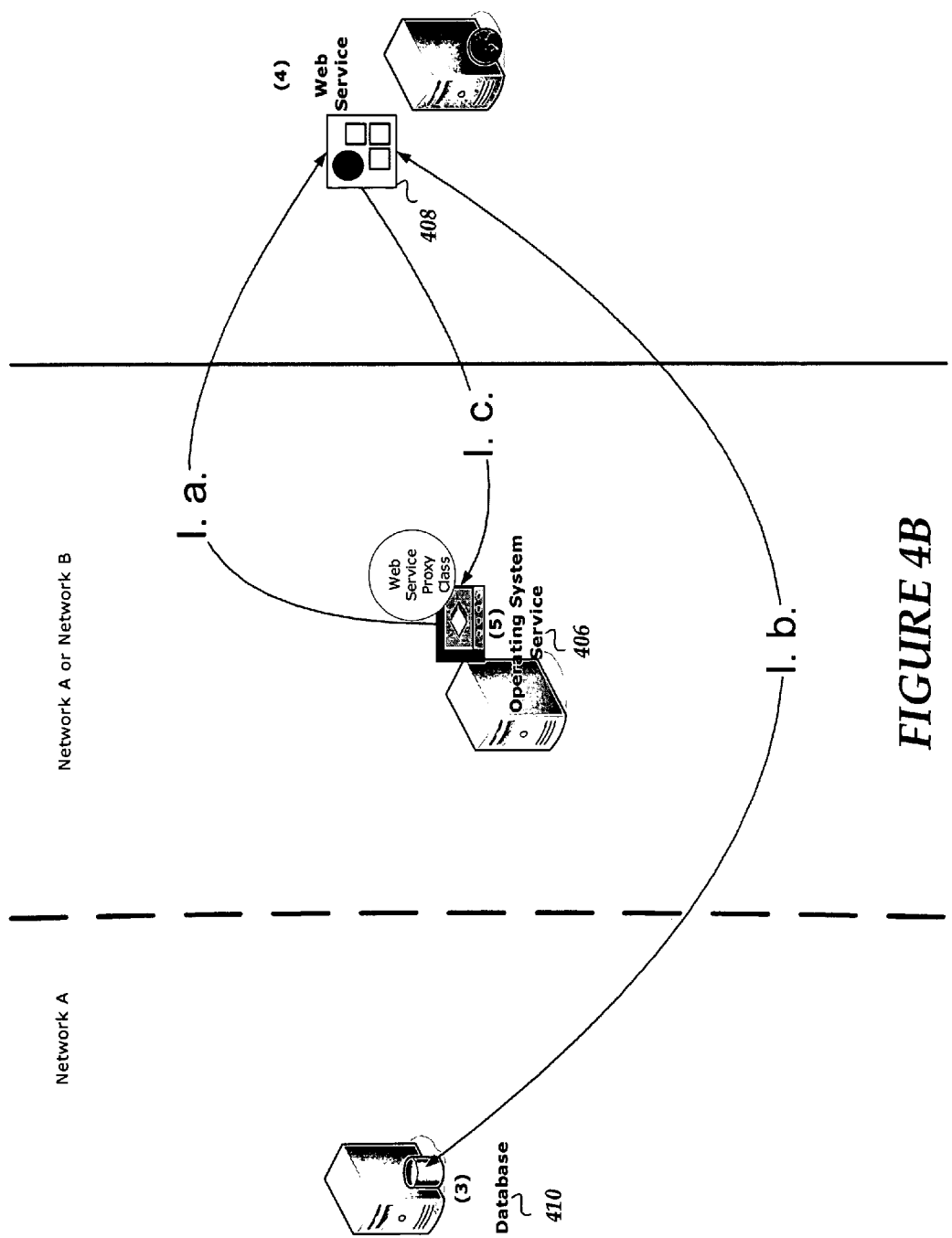

FIGS. 4A-4I depict functional block diagrams of a network 400 and various components for configuring, allocating, and deploying one or more computing systems, such as one or more test servers of one or more server pools 402 and 404. Elements of FIG. 2 are referred to in the following description. As shown in FIG. 4B, at I.a, the operating system service 406 wakes up and calls the web service 408 by proxy to obtain a list of test servers and the next deployment step required on each test server. At I.b, the web service 408 queries the database 410 for reservations which have a Reservation Status of Deploying or Expiring.

The web service 408 also finds test servers in the reservations whose DeplStatusValueID in the Resvs_Servers table corresponds with Done. For these servers, the web service 408 gets the reservation DeplSteps value from Reservations table and parses the value for deployment steps flags. The deployment step flags are then compared with test server's DeplStatusStageID value to determine a next deployment step. At I.c, the web service 408 returns test server/next deployment step pairs to the operating system service 406.

Figure 4C:
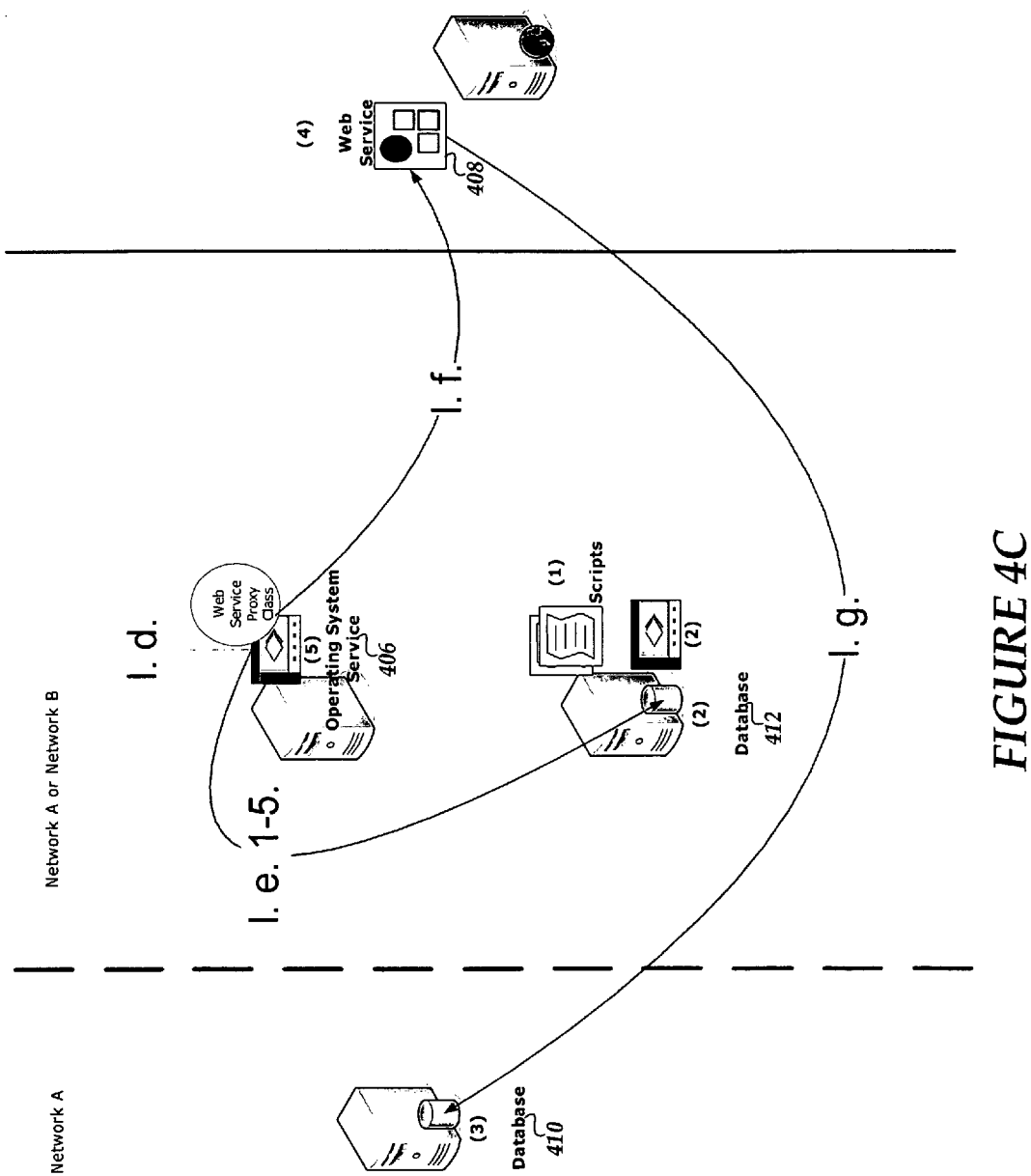

Referring now to FIG. 4C, at I.d, the operating system service 406 iterates through the returned test server/next deployment step pairs. If the next deployment step is deployment step 1 through 5, at I.1-5, the operating system service 406 makes a call to a stored procedure to schedule an Event corresponding to the step. At I.f, the operating system service 406 calls Update Deployment Status by proxy to update the deployment status. At I.g., the web service 408 uses a stored procedure to set the test server's DeplStageID to the Deployment Stage corresponding to the deployment step, and DeplStatusValueID to Running.

Figure 4D:
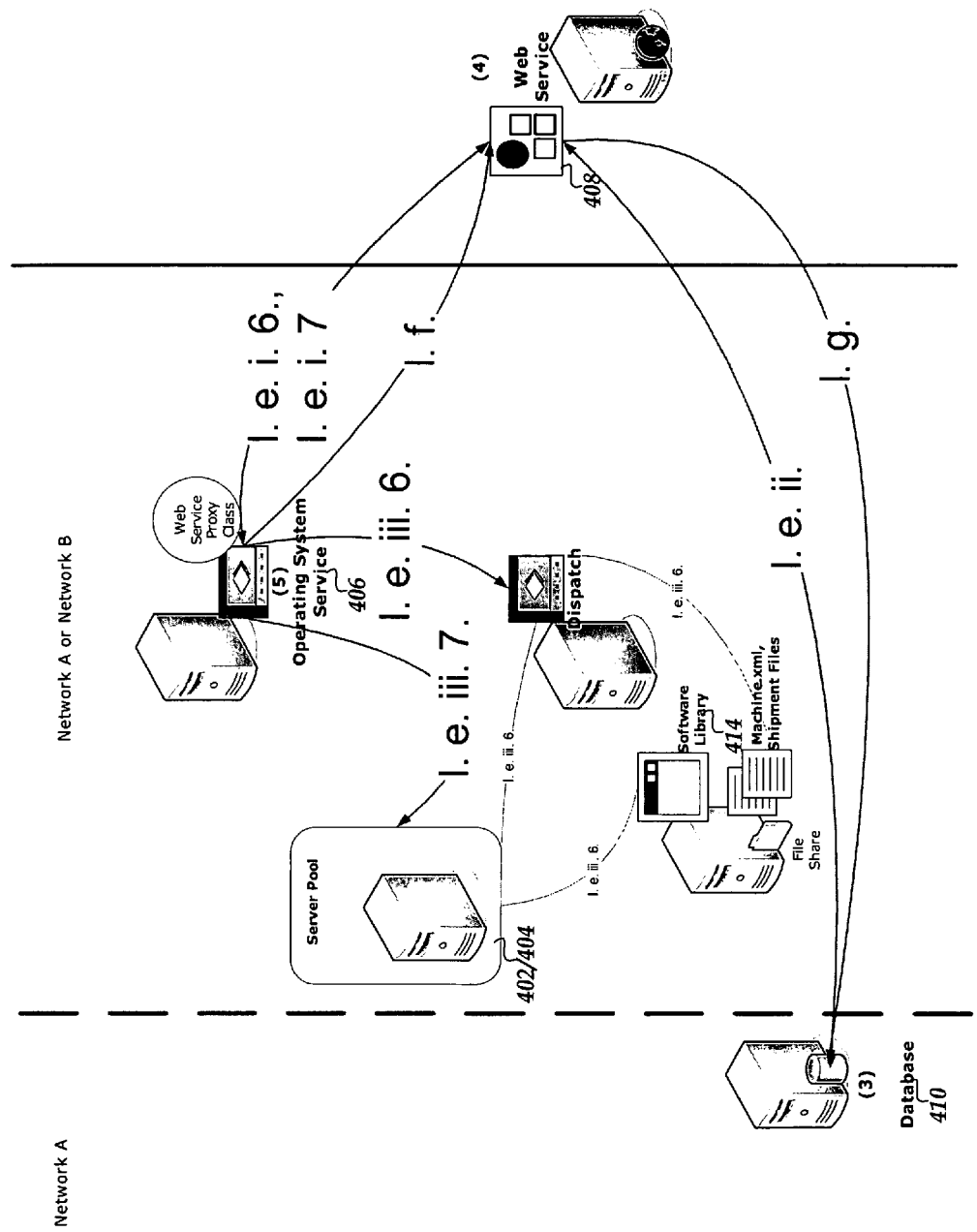

Referring to FIG. 4D, if the next deployment step is Dispatch, at I.e.i.6, the operating system service 406 calls web service 408 by proxy to query for machine and shipment file locations. If the next deployment step is Add Users, at I.e.i.7, the operating system service 406 calls the web service 408 by proxy to query for reservation users. At I.e.ii, the web service 408 queries the database 410 for information. If the next deployment step is Dispatch, at I.e.iii.6, the operating system service 406 creates a process, and kicks off Dispatch on the reservation. If the next deployment step is Add Users, at I.e.iii.7, the operating system service 406 creates a process, and kicks off Adding Users to the test server. At I.f, the operating system service 406 calls the web service 408 to update the deployment status (Update Deployment Status). At I.g, the web service 408 uses stored procedures in the database 410 to set the test server's DeplStageID to the Deployment Stage corresponding to the deployment step, and DeplStatusValueID to Running.

Figure 4E:
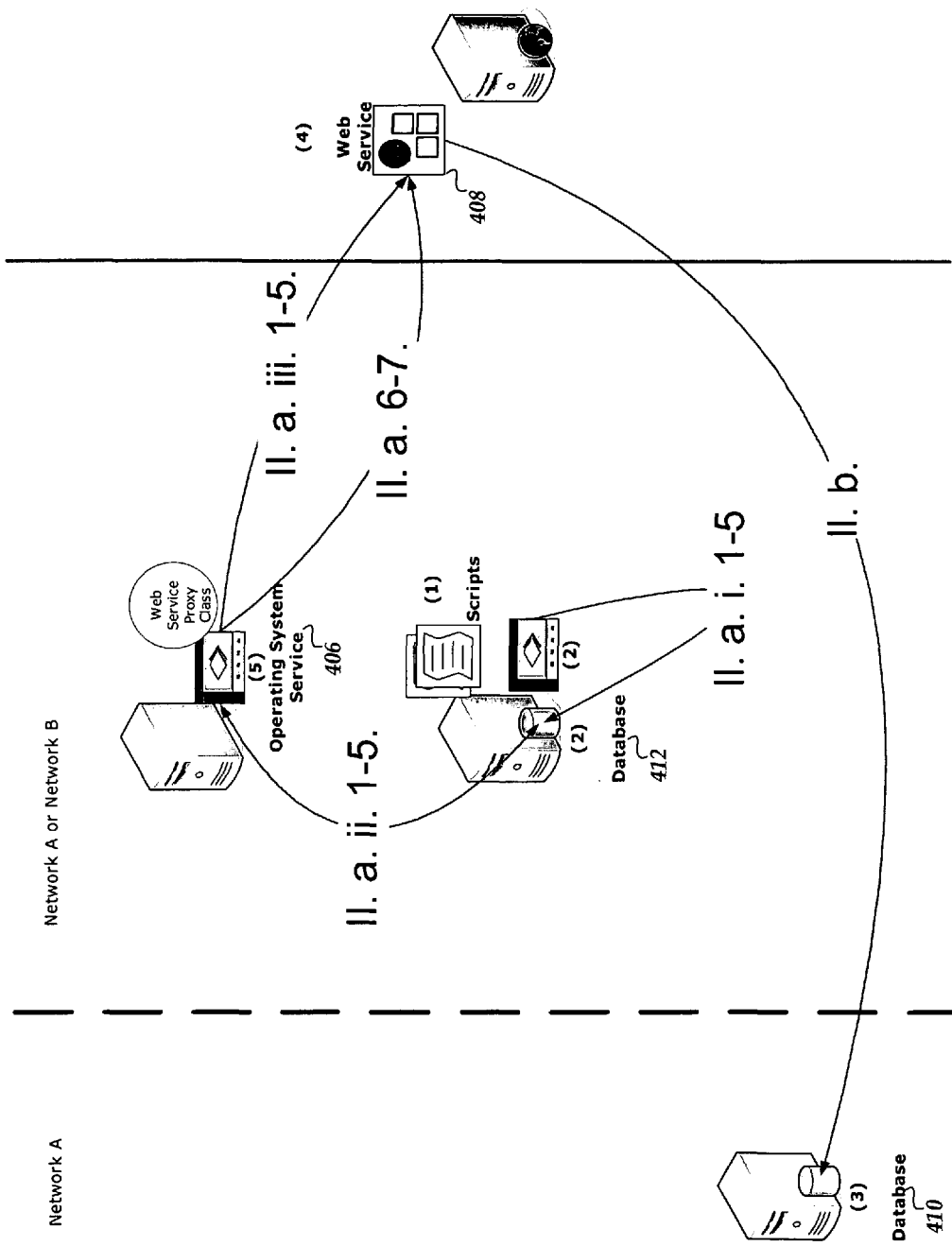

Referring to FIG. 4E, at II.a.i.1-5, as the associated scripts execute, script execution status is written to the database 412. At II.a.ii.1-5, the operating system service 406 wakes up and gets the status of executing Events from the database 412. At II.a.iii.1-5, the operating system service 406 calls the web service 408 by proxy to push the status to the database 410. At II.a.6-7, as Dispatch or Add Users deployment steps execute, the operating system service 406 calls the web service 408 by proxy to update the Deployment Status. If a deployment step finishes or encounters an error, at II.b, the operating system service 406 calls a stored procedure and resets DeplStatusValueID value from Running to either Done or Error.

If the DeplStatusValueID is Done, but the DeplStageID does not represent the last deployment step indicated in the reservation's DeplSteps, then the operating system service 406 will kick off the next deployment when it wakes up next, as described above. If the DeplStatusValueID is Done, and the DeplStageID does represent the last deployment step indicated in the reservation's DeplSteps, and if the reservation's Reservation Status is Deploying, the Reservation Status is reset to Ready. If the reservation's Reservation Status is Expiring, then the Reservation Status is reset to Archived, and the Availability Status of all servers in the reservation is reset from In Use to either Reserved or Unreserved.

Figure 4F:
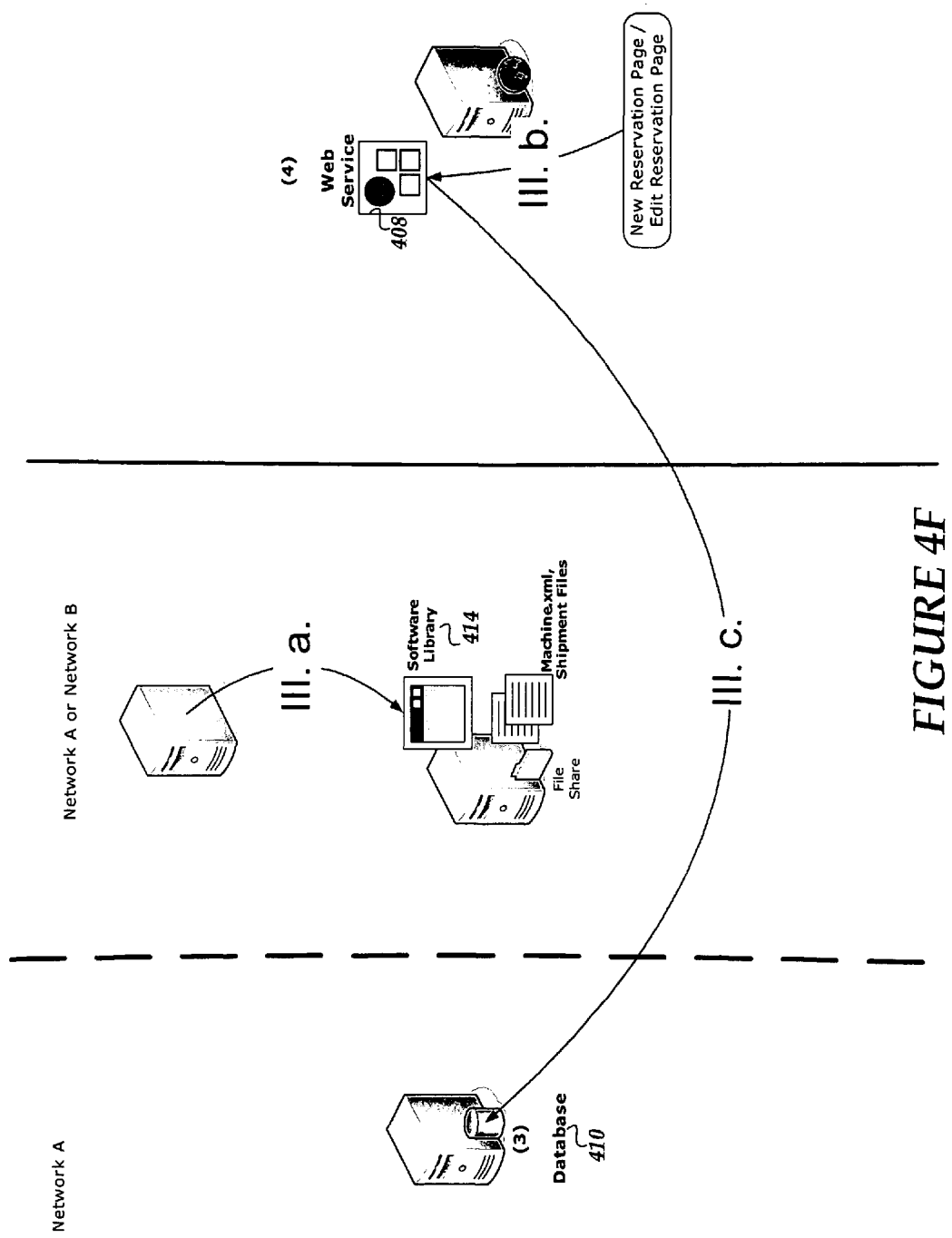

Referring to FIG. 4F, a user creates a new reservation. At III.a, if Reservation Type is Private Release (PR), the user saves the PR to the software library 414. At III.b, the user submits new reservation information using the user interface 416. At III.c, the database 410 uses stored procedures and the web service 408 to write submitted reservation data to the database 410. These procedures result in: setting the Reservation Status set to Not Yet Begun; setting the Deployment Status fields for each test server in reservation to Not Yet Started, Done, and 0; setting Server Availability Status for each test server in the reservation to Reserved; and, setting the DeplSteps value for the reservation to contain a Deployment Step Flag for each deployment step required for the Reservation Type (e.g. if the Reservation Type is Basic, then the Role Application step is not needed).

Figure 4G:
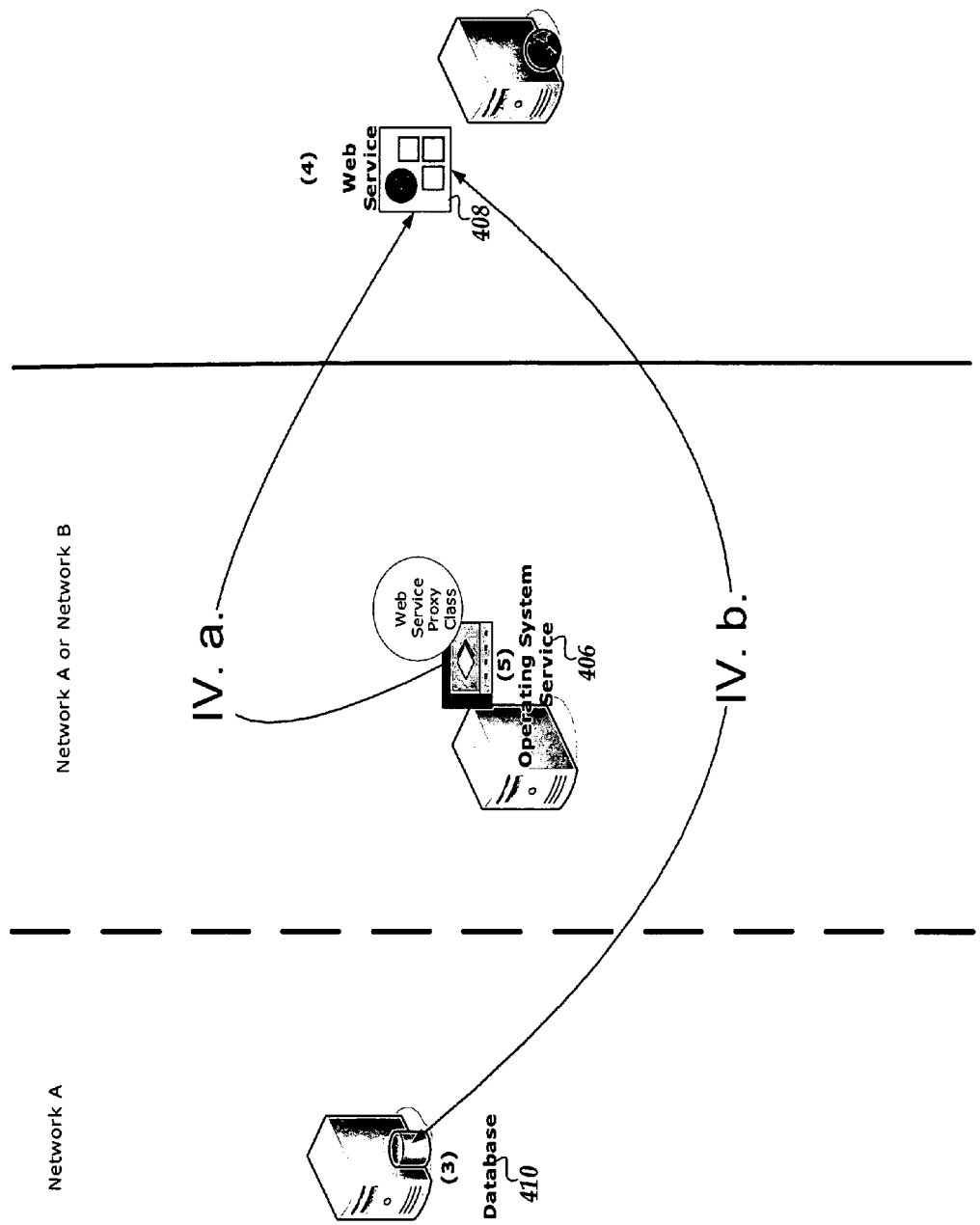
Figure 4H:
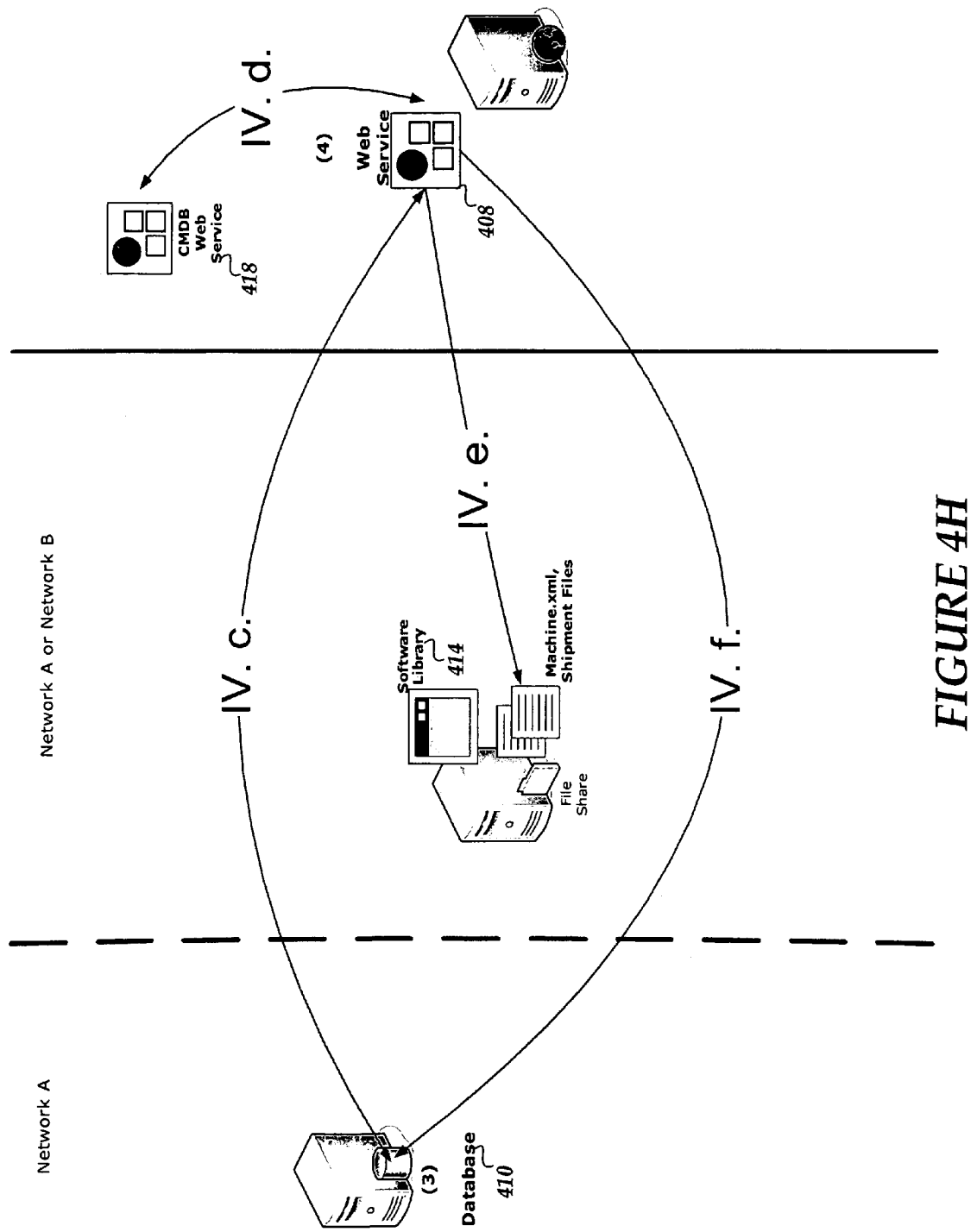

Referring to FIG. 4G, the new reservation begins. At IV.a, the operating system service 406 wakes up and uses the web service 408 proxy class to query the database 410 for new reservations for which deployment should begin. At IV.b, the web service 408 uses the stored procedures in the database 410 to query for these reservations and the stored procedures return a Reservation ID that corresponds with each reservation. Continuing with the new reservation and referring to FIG. 4H, at IV.c, the web service 408 queries the database 410 by Reservation ID for reservation details. If the Reservation Type is Duplicate Cluster, at IV.d, the web service 408 queries the CMDB web service 418 for a shipment file, and copies the shipment file to the File Share.

If the user has not uploaded a machine.xml file, at IV.e, the web service 408 generates a machine.xml file based on a machine.xml template, and copies the machine.xml file to the File Share. At IV.f, the deployment of the new reservation is ready to begin. Using the Reservation ID and the stored procedures in the database 410, the web service 408 resets the reservation's Reservation Status from Not Yet Begun to Deploying and resets Server Availability Status for each test server in reservation from Reserved to In Use. Since the Reservation Status is now Deploying, and the Deployment Status values for each test server in the reservation are Not Yet Started, Done, and 0, the operating system service 406 begins kicking off deployment steps for the reservation when it next wakes up, as described above.

Figure 4I:
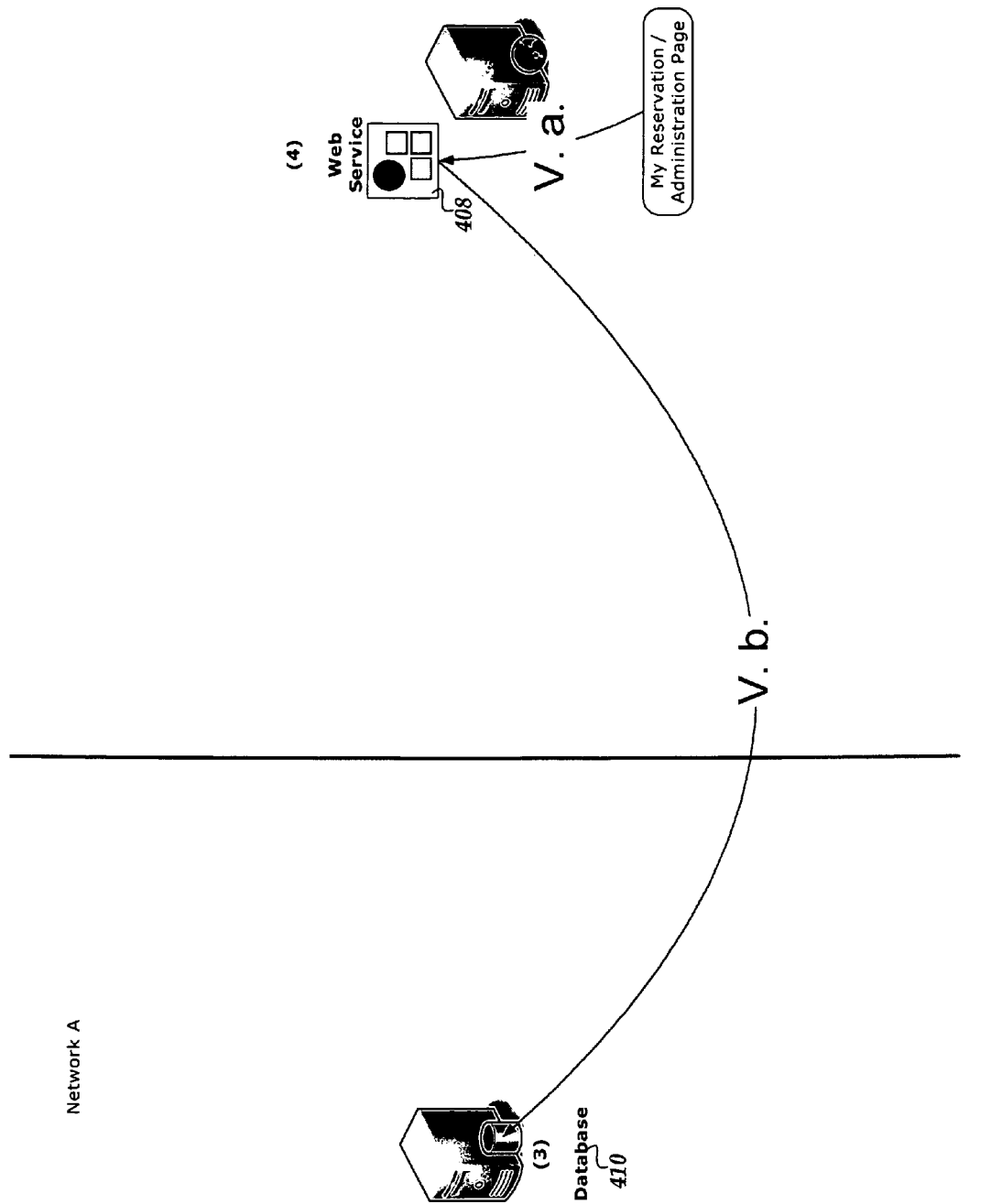

Referring to FIG. 4I, at V.a, the user signs off using the "My Reservation" Page of the user interface 410 which expires the reservation. At V.b., the web service 408: sets the reservation's DeplSteps value to contain only the OS Installation deployment step flag; sets the Deployment Status fields for every test server in the reservation to Not Yet Started, Done, and 0; and, sets the Reservation Status to Expiring. When the operating system service 406 next wakes up, it will kick off the OS Installation deployment step on all test servers in the reservation, as described above. Since OS Installation is the only step indicated in the DeplSteps value, when the OS Installation step is finished on all test servers in the reservation, the last deployment step is complete. As described above, the operating system service 406 now resets the Reservation Status. Since the Reservation Status is Expiring, the operating system service 406 will reset the Reservation Status to Archived, and reset the Availability Status of all test servers in the reservation.

Figure 5A:
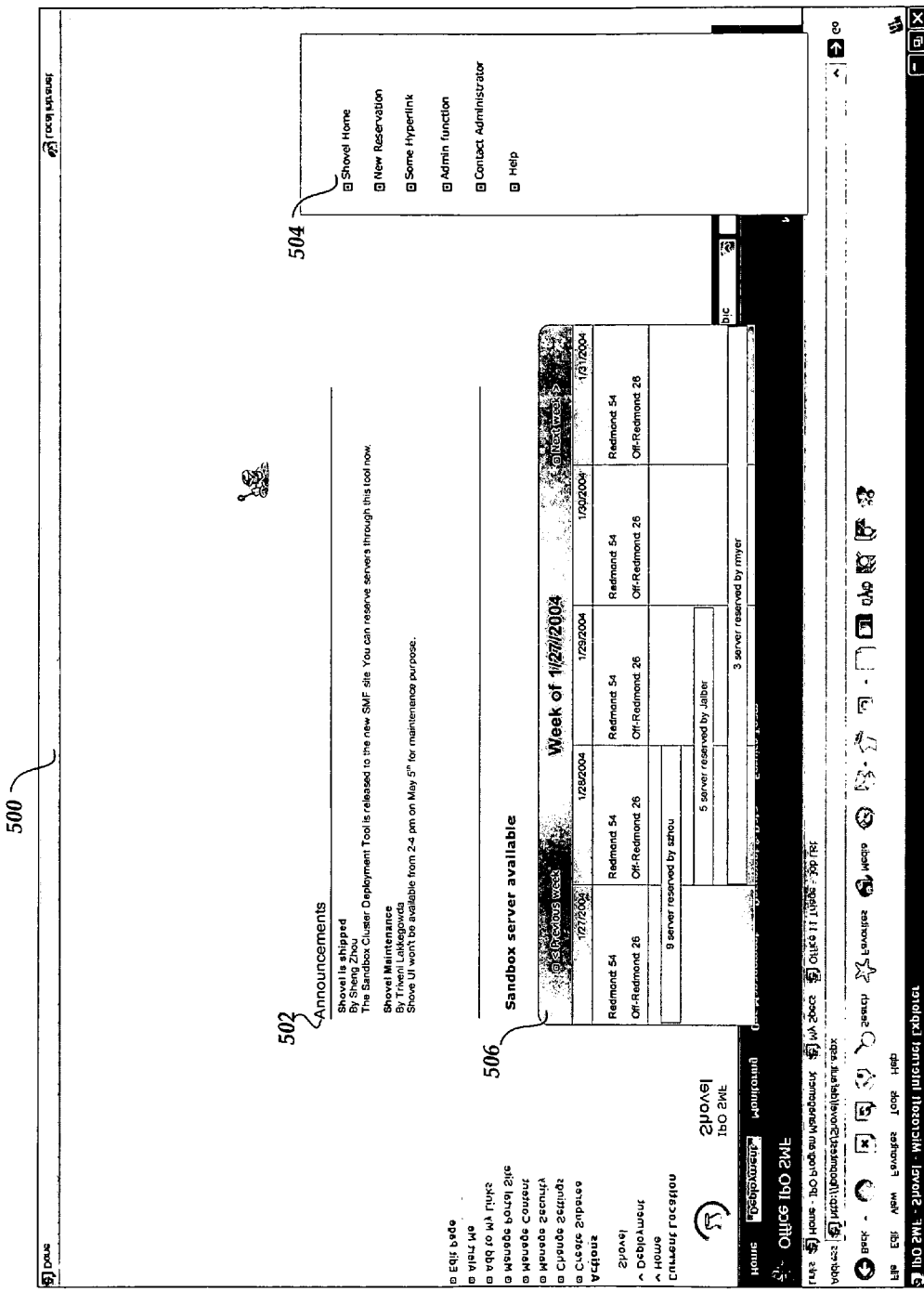
Figure 5B:
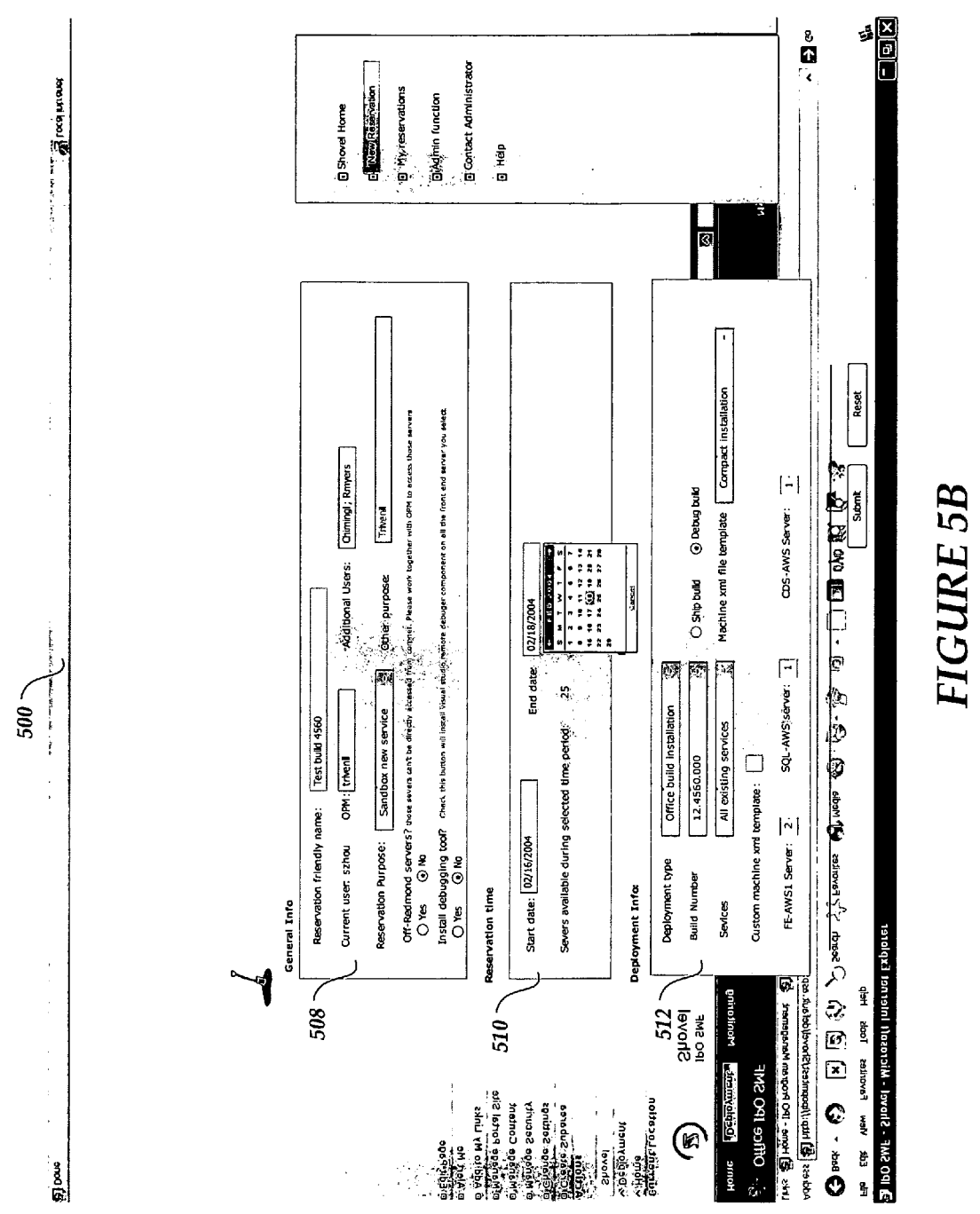
Figure 5C:
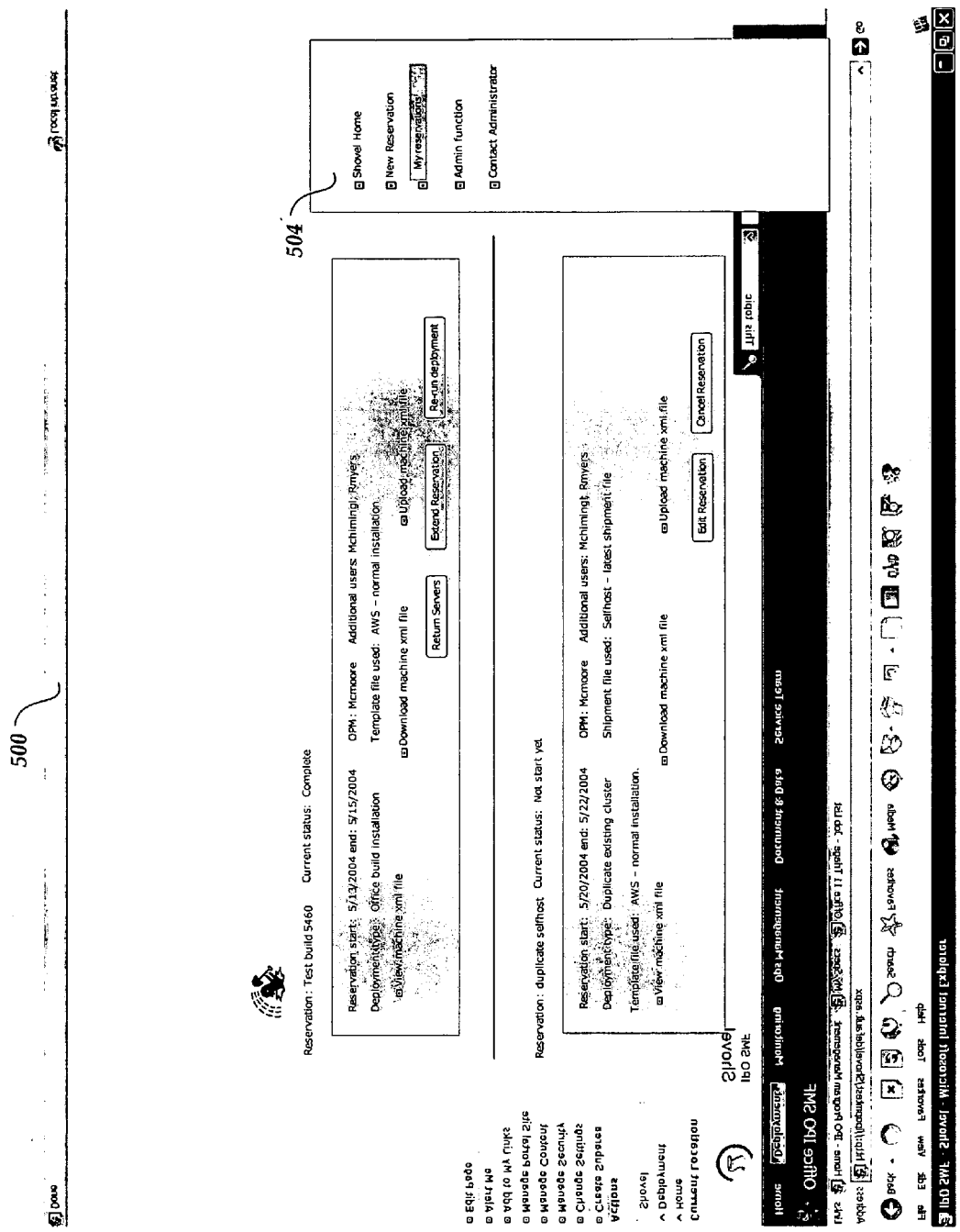

FIGS. 5A-5C depict various instances of a user interface 500 which enables a user to make a new reservation and/or manage an existing reservation, but is not so limited. As an example, a user can use the user interface 500 to reserve a number of servers for a specific testing purpose. The user interface 500 then renders server availability information for a server pool in a given domain. Once a request has been submitted, the components described above operate to dynamically configure, allocate, and/or deploy the number of servers according to the user request. As described above, the user receives a notification (e.g. e-mail) once the request has been fulfilled and the servers are configured, allocated, and deployed. As shown in FIG. 5A, the user interface 500 includes an announcement area 502 for displaying various information which serves to alert and inform the user. The user interface 500 includes a navigation area 504 where a number of options are presented for interaction by the user.

The user interface 500 also includes a calendar area 506 where a user can view server availability for a certain time period (e.g. daily, weekly, etc.). For example, suppose a user would like to make a new reservation which requires 2 servers for a certain testing purpose. The user can use the user interface 500 to see that the Redmond location has 54 servers in a server pool, while an Off-Redmond location has 26 servers in a server pool. The user can also see reservations of other users using the user interface 500. For example, the user can see that 9 servers are reserved from Jan. 27, 2004-Jan. 28, 2004, 5 servers are reserved from Jan. 28, 2004-Jan. 29, 2004, and that 3 servers are reserved from Jan. 28, 2004-Jan. 31, 2004.

Referring to FIG. 5B, a user has selected New Reservation from the navigation area 504. The New Reservation information includes a General Info area 508. The General Info area 508 includes the Current user, Additional Users, a reservation purpose, an OPM, a server designation, and a debugging tool query. The New Reservation information includes a Reservation time area 510. The user can select start and end dates using the drop-down calendar or by typing in dates. The Reservation time area 510 includes a notification of the number of servers available for a time period once the user has entered preferred start and end dates. The New Reservation information also includes a Deployment Info area 512. The Deployment Info area 512 includes a Deployment type, Build Number, Services, Ship or Debug build options, machine.xml template option, custom machine.xml option, and type/role options. As shown in FIG. 5B, the user has requested 2 FE-AWS1 servers, 1 SQL-AWS server, and 1 CDS-AWS server. As described above, the user input is used by the various components to configure, allocate, and deploy the requested items.

FIG. 5C depicts the user interface 500 after the user has selected My reservations from the navigation area 504. As shown in FIG. 5C, the user is able to review all of the pertinent details associated with the various reservations. The user has a number of available options such as: editing reservations, canceling reservations, returning servers to the server pool, extending reservations, and re-running a particular deployment. The user interface 500 described herein can be configured according to a desired preference and the invention is not intended to be limited to any particular examples and/or embodiments described herein.

As shown in FIG. 5C, the user interface 500 includes a "current status" field. In one embodiment, the "current status" field can include a number of values, such as: "Not started yet" (the deployment has not started on reserved machines); "Deploying" (in the process of deployment); "Complete" (the deployment has completed successfully and the User can use the machines now); "XML file error" (Error in the machine xml file used. Need user or OPM to correct the machine xml file); and, "System error" (problem with the deployment process).

An example of a tester using the user interface is as follows. The tester needs to verify one feature in the OFFICE AWS web site before the developer can check in the code and add the MSI package to the SH/ST cluster. The tester uses a web browser to load the user interface 500. Using the user interface 500, the tester books an AWS type of cluster for the following day. The tester also edits the machine.xml file using the user interface 500 to add the new package and specify the path for the PR drop. The tester receives an e-mail notification the next morning which lists the servers in the booked cluster and indicates that deployment is complete per the inputted information. The tester can then run any tests against that cluster, while also locally logging into the servers to check various functions. After verifying everything is okay, the tester sends an e-mail to the developer to check in the code. The tester can sign out of My Reservations, which expires the reservation.

A debugging example follows. A developer is part of the AWS team. One feature mysteriously fails on an integration cluster. The developer cannot debug directly in the integration environment as it can impact the whole cluster and other services. The developer uses the user interface 500 to book an AWS type cluster and selects the latest shipment file from integration. Based on the input, the exact content and code is installed as described herein to the booked cluster according to the selected shipment file. The developer now has a similar environment for debugging without impacting the original integration cluster.

Figure 6:
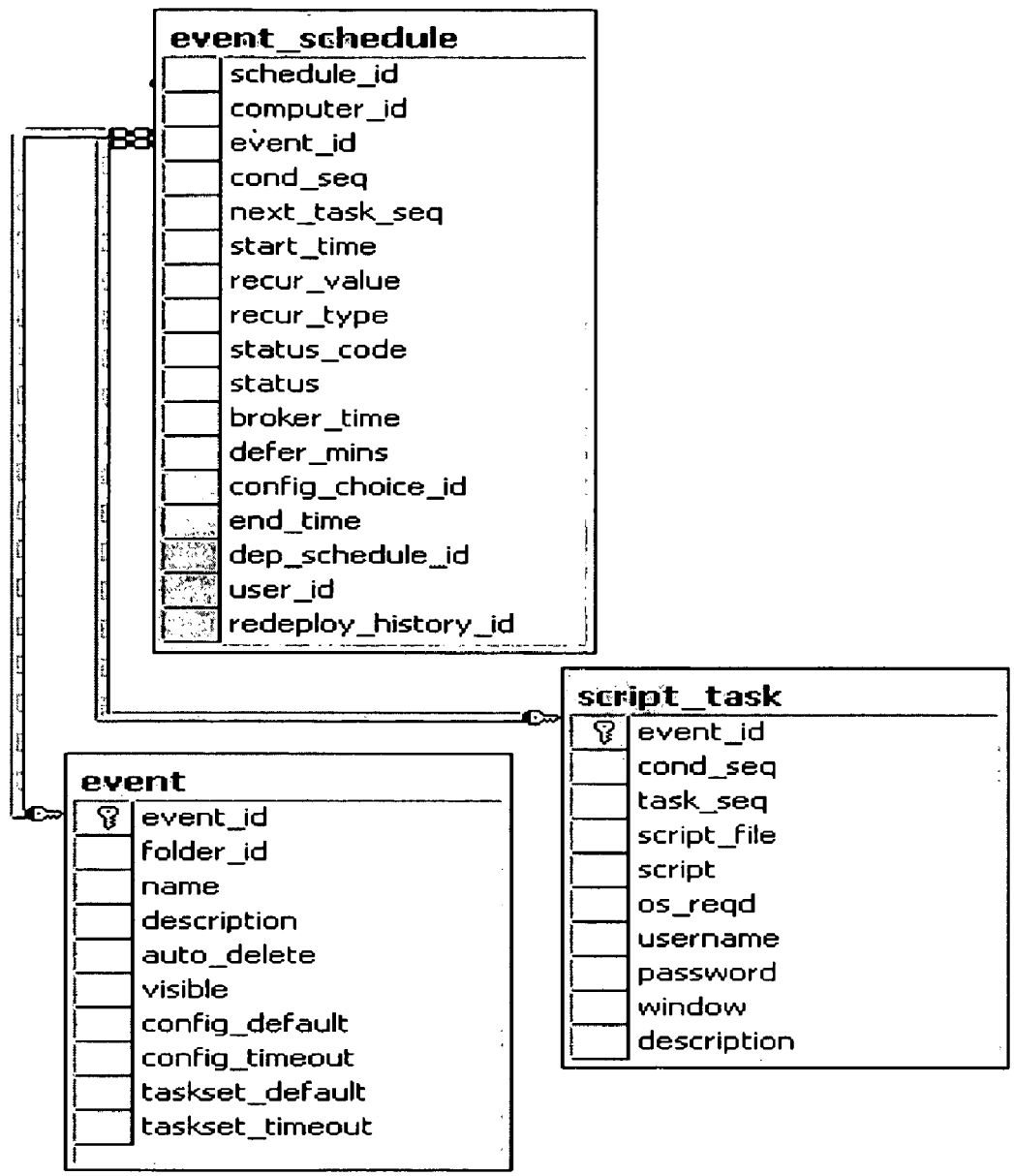
FIG. 6 is a diagram illustrating a number of tables.

FIG. 6 depicts a number of event and script tables which are associated with various scripts and corresponding events, in accordance with an embodiment. Each script can have a corresponding event entry in the event tables, and each event can be linked to the corresponding script by an entry in the script_task table as shown in FIG. 6. When an event is scheduled for a computing system, such as a test server for example, a new entry is created in the event_schedule table which includes a reference to the computing systems and the event. When the scheduled time of a scheduled event arrives, the execution status of the script is written on the computing system to other fields in the event_schedule table: start_time, end_time, status, status_code (e.g. for error codes), etc.

A variety of deployment configurations are available using the various components described above. A number of deployment possibilities are presented below.

The released OFFICE build installation is to set up a cluster of servers by using an official OFFICE build. The user can decide the build first and then select the machine.xml file template to use. As described above, a user can also use a custom machine.xml file template, which needs to be uploaded and checked. A list of machine types are listed for the installation according to the server role defined in the template.

The user can also determine the number of servers required for each server role. The requested number of servers is automatically selected from the server pool(s) and the machine.xml file is generated using server names from the selected servers of the server pool(s). The user can review the machine.xml file, including manual updates, if necessary. The updated version can be submitted and saved so it can be used for deployment. The syntax and tags are automatically verified in the updated machine.xml file before being saved.

The installation can support a number of services including, but not limited to: Shared component; ULS; AWS; Redirect service; R&R; Watson; IPO tools; Visio. Included in the user interface are a number of pre-defined xml templates, grouped by services. There are multiple templates for each service which define the common installation scenario for each service (e.g. compact installation with installing all possible components on a shared server, build with content or without content, etc.) There are also templates which have all the services currently installed for certain environments (e.g. TC5, integration, etc.).

The shipment file installation is to include all the jobs (e.g. code and content) currently deployed to a cluster or environment. An existing cluster can be quickly duplicated using the shipment file installation. This installation is useful for debugging or tests which need to simulate certain environments. Deployment based on shipment file is also an efficient way to install the code with corresponding content. Some shipment files include Selfhost, Selftest, integration, etc. Every time a job gets deployed to these clusters, the shipment files for the specific clusters are updated and saved to CMDB service. The previous shipment file is then marked as archived. The latest build of code is also included in the shipment file.

After a user selects the shipment file, the user can also select the machine xml file template to use. By using a different machine.xml file, the user can customize the deployed content. For example, the user may choose to install English instead of all the languages. The necessary server roles are automatically determined based on the information included in the machine.xml file. The user can then decide the number of servers for each server role, and the reserved server names are automatically added to generate the correct machine.xml file.

The PR installation is similar to the released OFFICE build installation. However, instead of using an Official OFFICE build, a user requests a PR build of existing service or new service. The user can install the PR bits by giving designating the PR location. Other changes may also be required, such as for a new service (e.g. adding a new jukebox property, etc.).

The basic server setup installation will not apply OFFICE code during the setup. A user can select the server type and then decide the number of servers. The basic server setup installation will install the OS plus the common configuration items to the reserved servers. The basic server setup installation can be used for an OFFICE server setup, by quickly setting up a number of clean servers. Other steps can be added to install other server components.

For example, server clusters can be dynamically configured, allocated, and/or deployed to test a service before the service is hosted, integrated, and eventually released. As further example, users can directly reserve a cluster of servers at a desired time (e.g. on a daily basis). The reserved cluster of servers can be dynamically configured with necessary code and/or content according to the user's request. Additionally, users can be designated with access permission based on the reservation content. Thereafter, one or more users can perform tests and other performance and configuration scenarios on the allocated cluster of servers. The cluster of servers can be returned to an available pool of servers once the reservation expires, and the freed servers can be used for a subsequent reservation. Embodiments are also configured to configure a special cluster for an uncommon purpose. For example, a large cluster is typically required for a performance test. The large cluster can be configured, allocated, and/or deployed by grouping all available servers into one large cluster.

Exemplary Operating Environment

Figure 7:
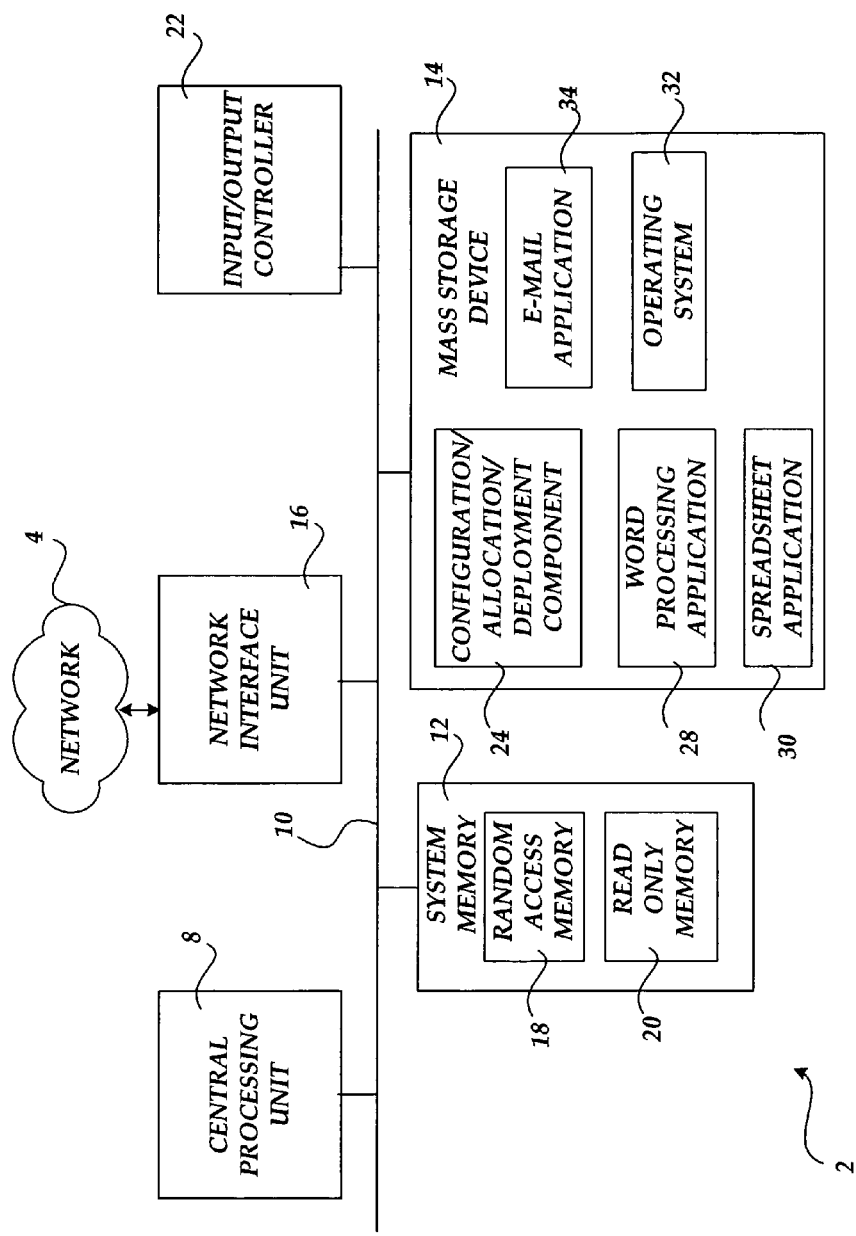
FIG. 7 is a block diagram illustrating a computing environment for implementation of various embodiments described herein.

Referring now to FIG. 7, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

Appendices A and B, which follow, illustrate representative schema files for use in dynamically configuring, allocating, and deploying a number of computing systems under an embodiment.

We claim:

1. A system to dynamically deploy one or more computing systems in a network, the system comprising: a processor; and a memory encoding instructions that, when executed by the processor, cause the processor to create:

a database component including a plurality of stored information and procedures for manipulating said information, comprising:

a reservation status defining a status of a reservation for one computing system in a pool of computing systems, the reservation status including: a not yet begun status indicating that the reservation has been made; a deploying status indicating when a time period for the reservation has arrived; a ready status indicating when all deployment steps required for the reservation are complete, wherein a single value is evaluated as a sum of unique numeric values specifying all deployment steps required to perform the reservation, each unique numeric value corresponding to a deployment step selected from a plurality of deployment steps to track whether a specific deployment step has been performed or not; an expiring status indicating when the time period for the reservation is expired; and an archiving status indicating when all resources associated with the reservation are released, a configuration status defining a configuration of the computing system in the pool, the configurations including a web server, an SQL server, a search server, and a content server, an availability status defining availability of the computing system in the pool, the availability status including: an unreserved status for each computing system that is not reserved in the reservation; a reserved status for each computing system that is reversed in the reservation; and an in use status for each computing system that is the currently deployed in the reservation, and a deployment status indicating a status of deployment for each of the computing systems in the pool, the deployment status including: a not yet started status when the reservation is made but the deployment is not yet started; a deployment step status indicating each step of the deployment when deployment is started; and a ready status when the deployment is complete indicating that the server is ready for another deployment;

an operating system service component to periodically communicate with the database component for one or more tasks to perform; and a web service component to provide a communication interface between the database component and the operating system service component, wherein the components operate together to deploy the one or more computing systems including configuring and allocating the one or more computing systems; wherein the computing system of the pool is reserved based in part on a reservation algorithm that is configured to allocate the at least one computing system based on at least the reservation status, the configuration status, the availability status, and the deployment status of the computing system.

2. The system of claim 1, wherein database includes information associated with a deployment configuration, wherein the information further includes at least one of a system role and a system type.

3. The system of claim 2, wherein database includes information associated with at least one of a test configuration and debug configuration.

4. The system of claim 2, wherein the system type is selected from at least one of a basic, office, private release, and duplicate cluster.

5. The system of claim 1, further comprising a script component to perform one or more configuration, allocation, and deployment procedures, wherein the script component includes at least one script associated with at least one event, and the at least one script is executed in association with an occurrence of the at least one event.

6. The system of claim 5, wherein the at least one script is selected from at least one of an operating system installation script, debugging tool installation script, type script, and role script.

7. The system of claim 1, wherein the operating system service further configured to provide an electronic notification to at least one user that the deployment is complete and ready for use.

8. A non-transitory computer readable medium including executable instructions which, when executed, allocate at least one server from a server pool by:
using a reservation algorithm that is configured to allocate the at least one server of the server pool based on at least the reservation status, the reservation status defining a status of a reservation for at least one server, the reservation status including: a not yet begun status indicating that the reservation has been made; a deploying status indicating when a time period for the reservation has arrived; a ready status indicating when all required deployment steps for the reservation are complete, wherein a single value is evaluated as a sum of unique numeric values specifying all deployment steps required to perform the reservation, each unique numeric value corresponding to a deployment step selected from a plurality of deployment steps to track whether a specific deployment step has been performed or not; an expiring status indicating when the time period for the reservation is expired; and an archiving status indicating when all resources associated with the reservation are released;
using a deployment input to configure the at least one server of the server pool, wherein the deployment input includes a deployment type, a deployment start time, and a deployment end time;
determining an availability of the at least one server based in part on the deployment input;
storing the deployment input if the at least one server of the server pool is available; and deploying the at least one server of the server pool based in part on the availability of the at least one server, wherein the deployment of the at least one server includes dynamically configuring the at least one server in accordance with the deployment input.

9. The non-transitory computer-readable medium of claim 8, wherein the instructions, when executed, allocate at least one server from a server pool by using a deployment type input, wherein the deployment type input is selected from at least one of a basic type, office type, private release type, and duplicate cluster type.

10. The non-transitory computer-readable medium of claim 9, wherein the instructions, when executed, allocate at least one server from a server pool by using a number input associated with the number of servers of the deployment type.

11. The non-transitory computer-readable medium of claim 8, wherein the instructions, when executed, allocate at least one server from a server pool by determining whether a deployment of the at least one server was successful.

12. The non-transitory computer-readable medium of claim 11, wherein the instructions, when executed, allocate at least one server from a server pool by assessing an associated machine file if the deployment of the at least one server was unsuccessful.

13. The non-transitory computer-readable medium of claim 8 wherein the instructions, when executed, allocate at least one server from a server pool by sending a notification after a successful deployment of the at least one server.

14. The non-transitory computer-readable medium of claim 8, wherein the instructions, when executed, allocate at least one server from a server pool by releasing the at least one server from an allocation after the deployment end time expires.

15. The non-transitory computer-readable medium of claim 8, wherein the instructions, when executed, allocate at least one server from a server pool by extending a deployment.

16. A method of dynamically configuring a number of computing systems in a pool of computing systems, the method comprising:
receiving input associated with a deployment configuration of the number of computing systems, wherein the input includes a deployment type for the number of computing systems and a time period to reserve the number of computing systems for deployment; using a reservation algorithm that is configured to allocate the at least one server of the server pool based on at least the reservation status, the reservation status defining a status of a reservation for the at least one server, the reservation status including: a not yet begun status indicating that the reservation has been made; a deploying status indicating when a time period for the reservation has arrived; a ready status indicating when all deployment steps for the reservation are complete; an expiring status indicating when the time period for the reservation is expired; and an archiving status indicating when all resources associated with the reservation are released;
assigning a unique numeric value to each deployment step of the deployment steps; calculating a single value as a sum of the unique numeric values assigned to each of the deployment steps and specifying all deployment steps required to perform the reservation, wherein each unique numeric value corresponds to a deployment step selected from a plurality of deployment steps to track whether a specific deployment step has been performed or not;
using the single value to track a status of the deployment steps;
allocating the number of computing systems based in part on an availability of the number of computing systems for the time period; and, deploying the number of computing systems for the time period if the number of computing systems is available for the time period, wherein the deploying includes automatically configuring the number of computing systems according to the deployment type.

17. The method of claim 16, further comprising automatically notifying a user of the deployment of the number of computing systems.

18. The method of claim 16, wherein the deploying further comprises automatically installing at least one of an OS, middleware, and one or more test bits on the number of computing systems.

* * * * *